US008152902B2

(12) United States Patent
Wood et al.

(10) Patent No.: US 8,152,902 B2
(45) Date of Patent: Apr. 10, 2012

(54) PACKAGING MATERIAL SUCH AS FILM, FIBER, WOVEN AND NONWOVEN FABRIC WITH ADSORBANCY

(75) Inventors: Willard E. Wood, Arden Hills, MN (US); Ronald A. Erickson, Edina, MN (US)

(73) Assignee: Cellresin Technologies, LLC, St. Paul, MN (US)

( * ) Notice: Subject to any disclaimer, the term of this patent is extended or adjusted under 35 U.S.C. 154(b) by 359 days.

(21) Appl. No.: 12/570,683

(22) Filed: Sep. 30, 2009

(65) Prior Publication Data

US 2011/0072967 A1 Mar. 31, 2011

(51) Int. Cl.
*B01D 53/04* (2006.01)
*C08L 23/02* (2006.01)

(52) U.S. Cl. .............. 95/144; 96/148; 96/154; 502/407; 206/524.4

(58) Field of Classification Search .................... 95/141, 95/144; 96/134, 135, 148, 153, 154; 502/402, 502/407; 252/184; 206/524.4
See application file for complete search history.

(56) References Cited

U.S. PATENT DOCUMENTS

| | | | |
|---|---|---|---|
| 3,274,905 A | 9/1966 | Demsey, Jr. et al. | |
| 3,365,750 A | 1/1968 | Donald | |
| 3,400,190 A | 9/1968 | Donald | |
| 3,440,686 A | 4/1969 | Corbett | |
| 3,476,627 A | 11/1969 | Squires | |
| 3,477,099 A | 11/1969 | Lee et al. | |
| 3,479,425 A | 11/1969 | Lefevre et al. | |
| 3,524,795 A | 8/1970 | Peterson | |
| 3,557,265 A | 1/1971 | Chisholm et al. | |
| 3,583,032 A | 6/1971 | Stafford | |
| 4,142,372 A * | 3/1979 | Kato et al. | 62/78 |
| 4,337,276 A * | 6/1982 | Nakamura et al. | 426/124 |
| 4,426,292 A * | 1/1984 | Wernick et al. | 210/635 |
| 4,539,399 A | 9/1985 | Armstrong | |
| 4,720,039 A | 1/1988 | Nishiguchi | |
| 4,856,649 A | 8/1989 | Inoue | |
| 5,350,788 A | 9/1994 | Visioli | |
| 5,371,322 A | 12/1994 | Selmeski | |
| 5,576,146 A | 11/1996 | Ali | |
| 5,698,370 A | 12/1997 | Keil et al. | |
| 5,773,105 A | 6/1998 | Klett | |
| 5,773,518 A | 6/1998 | Keil et al. | |
| 5,795,370 A * | 8/1998 | Garrett et al. | 96/130 |
| 5,829,669 A | 11/1998 | Drummond et al. | |
| 6,244,500 B1 | 6/2001 | Cahill et al. | |
| 6,776,947 B2 | 8/2004 | Brady et al. | |
| 6,862,980 B2 | 3/2005 | Heil et al. | |
| 8,002,877 B1 * | 8/2011 | Sadler | 95/144 |
| 2002/0192131 A1 | 12/2002 | Dussaud et al. | |
| 2003/0144448 A1 | 7/2003 | Ebara et al. | |
| 2004/0210099 A1 | 10/2004 | Shiratori | |
| 2005/0085144 A1 | 4/2005 | MacDonald et al. | |
| 2005/0136082 A1 | 6/2005 | Soane et al. | |
| 2005/0182234 A1 | 8/2005 | Wood et al. | |
| 2005/0260907 A1 | 11/2005 | Chang et al. | |
| 2006/0263502 A1 | 11/2006 | Horsham et al. | |
| 2008/0164439 A1 | 7/2008 | Fang et al. | |
| 2009/0045095 A1 | 2/2009 | Wagner et al. | |

FOREIGN PATENT DOCUMENTS

| | | |
|---|---|---|
| DE | 4008942 | 9/2005 |
| DE | 102004008913 A1 | 9/2005 |
| DE | 102004008938 A1 | 9/2005 |
| DE | 102004008939 A1 | 9/2005 |
| DE | 102004008941 A1 | 9/2005 |
| DE | 102004008942 A1 | 9/2005 |
| EP | 1525802 | 10/2004 |
| EP | 1559746 | 8/2005 |
| WO | WO-2005000369 | 1/2005 |
| WO | WO-2006072180 | 7/2006 |
| WO | WO-2006125834 | 11/2006 |
| WO | WO-2007137565 | 12/2007 |

OTHER PUBLICATIONS

International Search Report and Written Opinion, International Application No. PCT/US2010/050813, mailed Nov. 24, 2010 (14 pages).
Albunia et al., "Ethylene removal by sorption from polymeric crystalline frameworks", *Journal of Materials Chemistry*, 18:1046-1050 (2008).
Brody et al., "Innovative Food Packaging Solutions", *Journal of Food Science*, 73(8):R107-R116 (2008).
Choehom et al., "Senescent spotting of banana peel is inhibited by modified atmosphere packaging", *Postharvest Biology and Technology*, 31:167-175 (2004). Dabrowski, "Adsorption—from theory to practice", *Advances in Colloid and Interface Science*, 93:135-224 (2001).
Jacobsson et al., "Effects of type of packaging material on shelf-life of fresh broccoli by means of changes in weight, colour and texture", *Eur. Food Res. Technol.*, 218:157-163 (2004).
Kudachikar et al., "Effect of modified atmosphere packaging on shelf-life and fruit quality of banana stored at low temperature", *J. Food Sci. Technol.*, 44(1):74-78 (2007).
Lee et al., "Sorption Behavior of 1-Methylcyclopropene on Adsorbing Agents for Use in Extending the Freshness of Postharvest Food Products", *Food Sci. Biotechnol.*, 15(4):572-577 (2006).

(Continued)

*Primary Examiner* — Frank Lawrence, Jr.
(74) *Attorney, Agent, or Firm* — Pauly, DeVries Smith & Deffner, L.L.C.

(57) ABSTRACT

The invention relates to compositions that can be used to adsorb low concentration, preferably, for example less than 15 ppm, of unwanted or target substances. Typically the absorbance can be from an enclosed vapor phase. Such absorbency is accomplished in a contained substantially enclosed gaseous volume or atmosphere using a composition comprising a cyclodextrin compound and a polyethylenimine that can have an absorbency capability for low concentrations of unwanted or target substances. Such absorbency can be obtained with thermoplastic materials used in the form of bulk polymer or a film, fiber, web, woven fabric, nonwoven fabric, sheet, packaging and other such structures including or surrounding the enclosed volume. The adsorbent of the invention is typically used in the context of an enclosed volume, also known as an enclosed ambient vapor phase that contains the adsorbent of the invention and the unwanted or target substances at a concentration that is not desirable. The concentration should be reduced to non-offensive sensed limits or a limit that does not produce a biological response.

66 Claims, 1 Drawing Sheet

OTHER PUBLICATIONS

Martinez-Romero et al., Tools to Maintain Postharvest Fruit and Vegetable Quality through the Inhibition of Ethylene Action: A Review, *Critical Reviews in Food Science and Nutrition*, 47:543-560 (2007).

Mustaffa et al., "Standardization of carrier material as ethylene absorbent on shelf-life of 'Rasthali' banana", *J. Food Sci. Technol.*, 42(1):104-106 (2005).

Parida et al., "Adsorption of organic molecules on silica surface", *Advances in Colloid and Interface Science*, 121:77-110 (2006).

Scully et al., "Emerging packaging technologies for enhanced food preservation", *Food Sci. and Technol.*, 20(2):16-19 (2006).

Siro et al., "The microbial safety of strawberry and raspberry fruits packaged in high-oxygen and equilibrium-modified atmospheres compared to air storage", *International Journal of Food Science and Technology*, 41:93-103 (2006).

Szczerbanik et al., "Effects of polyethylene bags, ethylene absorbent and 1-methylkcyclopropene on the storage of Japanese pears", *Journal of Horticultural Science & Biotechnology*, 80(2):162-166 (2005).

Wareing, "Packaging trends: the past ten years", *New Food* (10th Anniversary Supplement), 2:66-67 (2007).

\* cited by examiner

PACKAGING MATERIAL SUCH AS FILM, FIBER, WOVEN AND NONWOVEN FABRIC WITH ADSORBANCY

TECHNICAL FIELD

The invention related to compositions used in packaging, including fiber, film and fabric, that can adsorb low concentration, preferably, for example less than 15 ppm, of unwanted or target substances from an enclosed vapor phase. Such absorbency is accomplished in a contained substantially enclosed gaseous volume or atmosphere using a composition that can have an absorbency capability for low concentrations of unwanted or target substances. The invention relates to containers that enclose the gaseous volume or atmosphere and have the absorbency capability.

BACKGROUND

A fundamental problem exists in adsorbing low concentrations of a variety of unwanted or target substances from enclosed volume or enclosed ambient vapor phase. At minimal parts per million concentrations, adsorbing significant quantities of a variety of unwanted or target substances from the enclosed ambient atmosphere (i.e.) from the enclosed vapor phase, becomes a significant problem. Low concentration target substances exhibit pressure less than $10^{-5}$ atmospheres.

Adsorption occurs when a solid surface is exposed to a gas or liquid and the enrichment of one or more of the components in an area of the interface. The term adsorption deals with the process in which molecules accumulate in the interfacial layer. The adsorption process is accompanied by absorption, i.e. the penetration of the gas or liquid into the solid phase. The total uptake (adsorption and absorption) of gas or liquid by a solid material is sorption. At low concentrations in the enclosed volume or enclosed ambient vapor phase, there is very little physical cause, on an energetic basis, for the substances to be adsorbed. Physical adsorption or condensation of the adsorbate on a specific surface is a reversible process that occurs at a temperature lower or close to the critical temperature (i.e., the temperature at and above which vapor of the substance cannot be liquefied) of an adsorbed substance. This adsorption process which proceeds only on flat surfaces (including macroporous surfaces or pore with internal width >50 nm) of a solid can be distinguished from capillary condensation which takes place if the adsorbent has a mesoporous (2-50 nm), microporous (<2 nm) or nanoporous (a subset of porous materials, typically having large porosities [greater than 0.4], and pore diameters between 1 to 100 nm) structures. Capillary adsorbate condensation does not occur in macropores. Capillary condensation plays an important but secondary role in comparison with physical adsorption of gases by porous solids.

Adsorption theory is based mainly on the Langmuir (concept of monolayer adsorption, formed on energetically homogeneous solid surfaces) and BET (multilayer isotherm equation proposed by Brunauer, Emmett and Teller) equations, capillary condensation theory, Polanyi potential theory (adsorption potential and the characteristic adsorption curve, which are independent on the of adsorption temperature) and the DR equation (adsorption based on considerations of adsorption energies) related to the latter. The Langmuir and BET equations have distinct deviations from experimental values particularly in the range of low and high relative pressures. The divergence between theory and experimental suggest the existence of additional physical factor that influences adsorption processes; an effect resulting from interactions in the interface area. The disparity is related to the energetic heterogeneity of most real solid (polycrystalline and amorphous) adsorbents. Without wishing to be bound by any theory, it is believed that it has been experimentally shown that the concept of surface heterogeneity (besides defects on the solid surface) can be disturbances in the structure and can be caused by additives (polyethylenimine) whose presence can affect significantly the surface properties of adsorbents.

When target substances are in the very low pressure range, adsorption takes place on the most active sites on the surface or within very narrow pores. Adsorbency by a synthetic polymer material such as polyolefin, polyester, polystyrene and other such materials in the functional form of fiber, film or fabric is one example of this substantial problem. We have also found, as the boiling point of the unwanted or target substances decreases, adsorption of the gaseous substance at a constant concentration become increasingly more difficult because the gaseous substances substantially remain in the vapor phase of the enclosed volume. The molecular interactions between the gaseous substance and interfacial layer are dependent on the particular surface composition and/or the pore structure. As a molecule in a vapor phase approaches a solid surface, a balance is established between the intermolecular attractive and repulsive forces. Further, many adsorbing materials, as bulk material or in a coating, can have a small residual charge present on the surface or displays a separation of charges, i.e., a dipole, effect. Any such extant charge or dipole can inhibit the target substance approach to a surface and prevent substantial adsorption on the surface. For example, in many containers a low, but objectionable, concentration of an unwanted or target substance can form and be maintained in the container contents.

SUMMARY OF THE INVENTION

The invention relates to improved absorbency that is derived from an adsorber comprising a combination of materials that can adsorb unwanted or target substances from an enclosed volume or enclosed ambient vapor phase. An adsorber with reduced charge effects and high surface area can obtain functional absorbency for low substance concentrations. Such absorbency can be obtained with thermoplastic materials that can be used in the form of a coating or in the form of bulk polymer in a film, fiber, web, woven fabric, nonwoven fabric, rigid sheet, cellulosic packaging and other such structures including or surrounding the enclosed volume. The absorbency can be used in a container structure to reduce the unwanted or target substances. The adsorbent of the invention is typically used in the context of an enclosed volume, also known as an enclosed ambient vapor phase that contains the adsorbent of the invention and the unwanted or target substances at a concentration that is not desirable. The concentration should be reduced to below detectable or sensed limits. Often the lowest possible concentration is desired.

The thermoplastic material of the invention contains an active adsorbing composition, having a certain defined minimum surface area. The material can have the adsorbent in the bulk polymer extending to the surface or in a surface coating. The adsorbent comprises a cyclodextrin (CD) compound in at least a monolayer coating in combination with an effective amount of a polyethylenimine compound, successfully overcomes the natural tendency of such materials to avoid adsorption. The CD can be a substituted CD or polyolefin-CD grafted material. Depending on context, virtually any chemical species or mixtures thereof can be an unwanted or target substance existing in enclosed volume or enclosed ambient vapor phase. Such substances can be present at a concentration of about 15 to 0.01 ppm 5 to 0.01 ppm; 1 to 0.01 ppm or less than 0.5 to 0.01 ppm (concentration based on the total volume) and can be the subject of the adsorption characteristics of the invention to reduce the concentration to a undetectable limit, a limit that is not offensive to humans or to a limit that does not produce a biological response. As the concentration of these materials in the vapor is reduced, the difficulty of absorbance increases.

The invention includes a thermoplastic composition comprising a thermoplastic polymer material, an active adsorbent composite that can maintain a balance of negative charge and positive charge material that can enhance the adsorption of compositions onto or into the adsorbent material. The compositions of the invention can also contain materials that can enhance or increase the surface area of the surface of the thermoplastic articles. An increased surface area and favorable pore size can increase the adsorption of compounds into the adsorbing materials. The thermoplastic material of the invention can be used in a variety of end uses including webbing layers or structures, protective barrier fabrics or articles, filtration units, face masks, storage bags, garbage bags, deodorizing materials and other such applications. One particularly useful application is a storage bag for fresh fruits and vegetables that can actively adsorb ethylene from the contained or enclosed atmosphere, reducing the ethylene concentration within the packaging to a level that can reduce the ripening of the fruits and vegetables, thus extending shelf life and product quality.

For the purpose of this patent disclosure, the term "degree of substitution (D.S.)" for the cyclodextrin means the statistical average number of substituents on each glucose moiety of the cyclodextrin ring. The term "produce" means any respiring plant material that can generate a concentration of ethylene in its growth or maturation and known as climacteric crops. The term "enclosed volume or enclosed ambient vapor phase" means the atmosphere containing the target substance. This volume or vapor phase can comprise the intended space within a container. The container can comprise the adsorbent materials or can contain the materials. In the later case, for example, a flexible or rigid package may contain a small piece of adsorbent nonwoven fiber. "Unwanted or target substances" includes gaseous substances or volatile substances that can be present in the enclosed volume at a concentration typically less than about 15 ppm based on the atmosphere taken as a whole and can have a concentration of about 15 to 0.01 ppm; 5 to 0.01 ppm; 1 to 0.01 ppm or less than 0.5 to 0.01 ppm. Alternatively, such target substances can often be found in the contained atmosphere as a concentration of about 10 to about 1 ppm, about 1 to about 0.1 ppm or about 0.1 to about 0.01 ppm. The unwanted or target substances can exist in the enclosed volume or enclosed ambient vapor phase as a gas, vapor or dispersion of a liquid or solid. These substances often are malodors, irritants, or offensive or inoffensive odor compounds.

The term "container" is used in its conventional meaning. The term "fiber" is used in its conventional meaning. The term "fabric" typically means both woven and nonwoven webs including materials of various thicknesses, lengths, widths and compositions. Products include fabrics made typically from the thermoplastic fibers of the invention but can also contain other fabrics such as cellulosics, linens, and others. The applications for the materials of the invention can be used in face masks, tissue, wipes, towels, clothing, furniture, automotive and other transportation, filtration for industrial or consumer applications. The fibers used in yarn or other nonwovens as described in the invention typically means fibers having relatively small fiber diameters. Such a diameter is generally ranging from about less than 1 micron to as much as 100 microns. Often such fibers have a diameter from about 1 to about 50 microns. Once assembled, a final product can include one or more of the structures disclosed above. The fiber can be combined in a thermoplastic layer, two or more thermoplastic layers can be combined, and a woven fabric can be combined with a nonwoven fabric which can also be laminated onto a film or other such structure. There are a variety of combinations or combinations of the structures of the invention that can be made without departing from the spirit and scope of the invention.

DETAILED DESCRIPTION OF THE INVENTION

Figure 1:
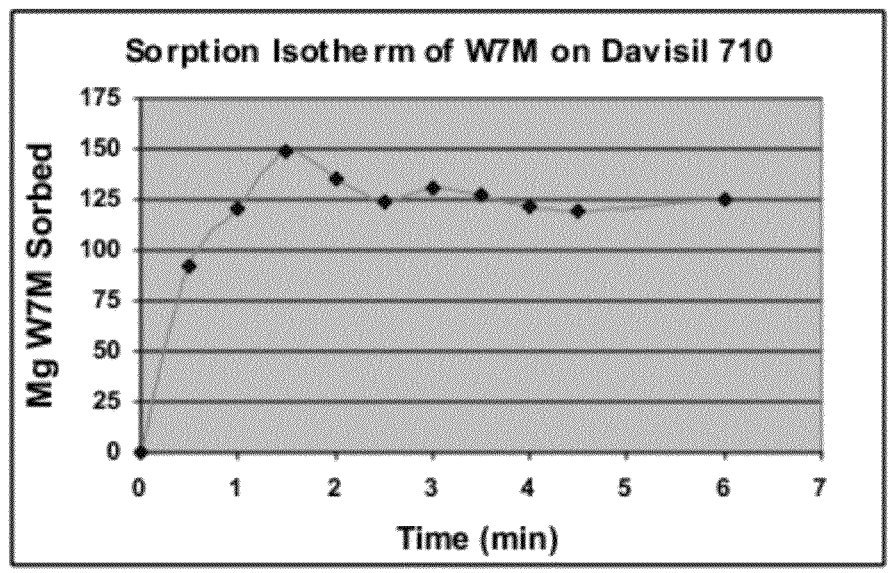
FIGS. 1 and 2 demonstrate the useful properties of the substituted CD materials on a silica substrate

The adsorptive compositions of the invention can contain a substituted CD or a polymer with pendent CD moiety. These materials can be coated, extruded, laminated, woven, or molded into a variety of useful films, sheets, fibers, nonwoven webs, monolithic structures, or other shapes using conventional processing technology. These useful forms can be incorporated into a container configuration. The substituted CD or polyolefin-CD grafted material can be a coating or in the bulk polymer.

Virtually any chemical species can be an unwanted or target substances. The unwanted or target substances can exist in the enclosed volume or enclosed ambient vapor phase as a gas, vapor or dispersion of a liquid or solid. These substances often are malodors, irritants, or offensive or inoffensive odor compounds. Such compound chemical families include alkanes, alkenes, alkynes, alkane thiols, alkyl sulfides, alcohols, aldehydes, amines, carboxylic acids, ethers, and ketones. Non-limiting example compounds include methane, ethane, propane, butane, ethylene, acetylene, propylene, 1-butene, 2-butene, allene, isobutene, 1,3-butadiene, 1-butyne, 2-methylpropene, 2-methyl-2-butene, cyclopropane, cyclobutane, methylcyclopropane, methanethiol, ethanethiol, 1-propanethiol, 2-propanethiol, 2-butanethiol, carbonyl sulfide, methyl allyl sulfide, methyl sulfide, dimethyl disulfide, dimethyl trisulfide, ethyl sulfide, methyl propyl sulfide, allyl mercaptan, formic acid, formaldehyde, acetaldehyde, acrolein, diacetyl, dimethyl ether, diethyl ether, methylamine, dimethylamine trimethylamine, ethylmethylamine, butylamine and cyclopropylamine.

Such substances can be present at a concentration of about 15 to 0.010 ppm and can be the subject of the adsorption characteristics of the invention to reduce the concentration that cannot be sensed by humans or to a limit that does not produce a biological response. An offensive limit refers to the limit which is objectionable or unpleasant to an individual to sense the unwanted or target substances. A limit that can produce a biological response refers to the amount that a pheromone or gaseous hormones such as ethylene can produce its desired result in a biological organism.

Ethylene is an example of an unwanted or target substance that can produce a biological response. Ethylene is a gaseous hormone that promotes ripening in fresh fruits, vegetables, flowers and other respiring biological products. Reduction of ethylene concentration can inhibit ripening and extend product lifetime. Post harvest climacteric corps have different ethylene sensitivity and respiration rates; for example, ethylene production rates (μL·kg$^{-1}$·hr$^{-1}$) for blueberries, pineapples and raspberries is 0.1 to 1, bananas, melons and tomatoes is 1.0 to 10, and apples, peaches and pears is 10 to 100. Preferable, the concentration of ethylene in an enclosed volume or enclosed ambient vapor phase for sensitive crops should be less than 0.10 ppm ethylene (vol./vol) or about 1 to 5 μL kg$^{-1}$ of product based on the entire enclosed volume.

Polyethylenimine is a polyamine made by polymerizing the cyclic monomer ethylene imine. The typical polymer can contain primary terminal (—NH$_2$) groups, secondary (—NH—) amine groups within the polymer and in a chain branch and tertiary amine groups at a branch point. Linear polyethylenimines (PEIs) contain primarily secondary amines with terminal primary amine groups. Branched PEIs contain primary, secondary and tertiary amino groups. The linear PEIs are solids at room temperature where branched PEIs are liquids at all molecular weights. Linear polyethylenimines soluble in hot or cold water, at low pH, in methanol, ethanol, or chloroform and is insoluble in benzene, ethyl ether, and acetone. Polyethylenimine (CAS REGISTRY NUMBER 09002-98-6) is represented by the following general formula:

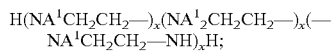

wherein each A1 is independently hydrogen, an alkoxy group or a linear or branched polyethylenimine group and wherein each x is independently from 5 to 20,000.

Polyethylenimine has an average molecular weight from about 500 to about 1,000,000; preferably from about 2,000 to about 800,000; more preferably from about 10,000 to about 750,000; and most preferably from about 50,000 to about 750,000. Non-limiting examples of additional materials include: epichlorohydrin modified polyethyleneimine, ethoxylated polyethyleneimine, polypropylenimine diamine dendrimers, poly(1,2-dihydro-2,2,4-trimethylquinoline), and poly(dimethylamine-co-epichlorohydrin-co-ethylenediamine). Silica particles can be used to enhance the surface area of the materials of the invention. In particular, silica gel particles that are preferred for use in the invention are relatively small particle size materials having large surface areas per gram. The particle size of the preferred materials range from about 0.007 to 700 microns and the preferred materials have a surface area that ranges from about 200 to 1,000 m$^2$·gm$^{-1}$. The compositions of the invention are often prepared by dispersing the polyethylenimine materials onto and into the silica materials for the purpose of introducing relatively high surface area silica substrate with an available polyethylenimine material on the silica surface. Such a material can then be combined with the cyclodextrin or cyclodextrin polymer of the invention to make the useful adsorbent compositions of the invention.

The invention uses three forms of amorphous silica-silica gel, precipitated silica and fumed silica. Synthetic amorphous silica (CAS #7631-86-9), a form of silicon dioxide (SiO$_2$) is manufactured, thus differentiating it from naturally occurring amorphous silica, e.g. diatomaceous earth. As a manmade product, it is greater than 95% pure amorphous silica whereas naturally occurring amorphous silica also contains crystalline forms of silica. Amorphous silica can be further divided into two forms that are characterized by their distinct manufacturing processes—wet process silica (CAS #112926-00-8) which includes precipitated silica and silica gel, and thermal process silica (CAS #112945-52-5) which includes fumed or pyrogenic silica. Fumed silica is essentially non-porous whereas precipitated silica contains some micropores (>0.3 μm) and silica gel is highly porous and contains macro-, meso-, and micro-pores offering a pore size range from 0.0001 to 1 μm. Pore size is defined as the pore width measured as the diameter of the cylindrical pore or distance between opposite walls of the slit. Fumed silica is commercially manufactured by Degussa Corporation (Areosil) and Cabot Corporation (Cab-O-Sil). Silica gel is manufactured by W.R. Grace (Davisil) and Merck Chemicals.

The substituted CD or polyolefin-CD grafted material can be used in a layer or coating on a polymer or in bulk polymer. Various polymers can be envisioned in blends with a substituted CD or a polymer with pendent CD moiety of the invention; in other embodiments a polymeric article can be coated with an aqueous solution or extrusion coated with a substituted CD or a polymer with pendent CD moiety. Alternatively, a polymeric article can be topped with a film or nonwoven layer of a substituted CD or a polymer with pendent CD moiety. The chemical composition of polymers that can be is not limited by the scope of this disclosure, but instead can be any polymeric material that is compatible in a solution or melt with a CD, a substituted CD or a polymer with pendent CD moiety, wherein the blend has useful physical properties for the application that is the end result of the use of the blend. For example, nylon, polyethylene, polyesters, polypropylene, polystyrene, ethylene vinyl acetate copolymers, polyurethanes, poly-α-olefins such as polybutadiene and poly α-octene, and polyamides such as nylon-6 and nylon-6,6, polyureas, polycarbonates, polyethers, polyketones, poly(vinyl chloride), fluoropolymers, and silicone polymers are commonly used polymers in forming useful articles. Similarly, many commercially useful copolymers, terpolymers, and the like can be used. For example, polyesters, PLA polymers and copolymers, acrylonitrile-butadiene-styrene (ABS), poly(ethylene oxide)-co-(propylene oxide), ethylene-vinyl acetate copolymers, poly(ether-ether-ketone) and the like are useful copolymers and terpolymers for various end use applications.

One class of useful polymers is polyolefins, including polyethylene, polypropylene and related copolymers and terpolymers. In some embodiments of the mixture of a substituted CD or a polymer with pendent CD moiety can be used or blended with an unmodified polyolefin resin. In these embodiments, the unmodified thermoplastic resin can have a melt index of about 0.5 to 1800 g-10 min$^{-1}$, and the modified polymer can be derived from a polymer having a melt index of about 0.7 to 1,500 g-10 min$^{-1}$, or about 1 to 1,200 g-10 min$^{-1}$. Another class of useful polymers is polyesters. Polyesters are a generally useful class of polymers from which many containers, nonwoven fabrics, and various other articles are made. Uses of polyesters include applications set forth in co-pending U.S. patent application Ser. No. 10/163,817. One useful polyester material that can be incorporated into a blend with, or topically coated with the invention is polylactic acid, or polylactide (PLA). PLA is a biodegradable, thermoplastic, aliphatic polyester derived from renewable resources and having a general repeat unit of —CH(R)—C(O)—O—. It is most commonly formed from starting materials such as corn starch or sugarcane. Bacterial fermentation is used to produce lactic acid, which is oligomerized and then catalytically dimerized to make a lactide monomer for ring-opening polymerization. It can be easily produced in a high molecular weight form through ring-opening polymerization using most commonly a stannous octoate or tin (II) chloride ring opening catalyst. PLA can be processed like most thermoplastics into fiber (for example using conventional melt spinning processes) and film. NatureWorks LLC, a wholly owned subsidiary of Cargill Corporation, produces PLA under the trade name NatureWorks polymer. Other companies from which PLA can be obtained include Toyota (Japan), Hycail (The Netherlands), and Galactic (Belgium).

Because it is biodegradable, PLA can be employed in the preparation of bioplastic for such articles as food packaging, loose fill packaging, and disposable containers. PLA can also be made into fibers.

The substituted or polyolefin-CD grafted materials used with thermoplastics are highly versatile materials which can be processed into a wide variety of package and structure types. Principal manufacturing processes used in producing packaging materials include, for example, cast-film extrusion, blown-film extrusion (tubular), extrusion coating, extrusion lamination, adhesive laminations, oriented extruded films, blow molding, injection molding, and compression molding. For packaging purposes, thermoplastics can usually be processed into one of the following structural categories: flexible films, rigid sheets, bottles and tubs.

The invention is directed to reducing the concentration of unwanted or target substances within an enclosed atmosphere or vapor phase. Such an atmosphere or vapor phase is often held within and substantially surrounded by a container. The term "container" in the context of the invention is used in its conventional meaning. Such containers can include virtually any article that can enclose the vapor phase or atmosphere of the invention. The containers can be made from virtually any materials including cellulosics, plastics, thermosets, metals and other conventional packaging materials. The containers can obtain virtually any geometric shape or dimension. The internal volume of the container can range from as small as 10 millimeters to more than 100 liters, but typically ranges from about 100 millimeters to 4 liters in size. The configuration of the container can be virtually any configuration, including containers made from flexible plastic, rigid and semi-rigid sheet, blow molded plastic bottles, folded and glued paperboard materials, plastic and cellulosic envelopes and other container configurations. The important characteristic of the container of the invention is that it encloses the atmosphere or vapor phase of the invention and can be made firm or combined with the compositions of the invention for the purpose of reducing the concentration of the unwanted or target compositions of the invention from the enclosed atmosphere or vapor phase. In this regard, in the manufacture of the containers of the invention, the compositions of the inventions can be incorporated into the materials from which the containers are made. For example, a PET beverage container can be made from a thermoplastic polyester that contains the cyclodextrin compounds and the other materials of the invention that can reduce the concentration of undesirable or target substances that can form within the vapor phase held within the PET plastic container. Alternatively, such a container can be made by coating the interior of the container with the compositions of the invention or introducing into the interior of the container an insert material that can be made from the composition of the invention or coated by the compositions of the invention and as long as the insert is held within the internal structures of the invention, the compositions of the invention can reduce the concentrations of the unwanted or target composition. The insert comprising the compositions of the invention or a material coated with the compositions of the invention can take a variety of embodiments. For example, a flexible food wrapper can be coated with the compositions of the invention. Such a wrapper can be made from thermoplastic materials or from cellulosic or paper derived compositions. Such wrappers can be used as a primary wrapping structure or can comprise an internal envelope containing a food product, for example, as used in an internal envelope for breakfast cereal. The thermoplastic compositions in the invention can be formed into virtually any shape or configuration useful in packaging food and the coating compositions of the invention can be coated on virtually any container surface useful in packaging technologies. Another embodiment of the invention is a porous nonwoven (spun-bond or melt-blown) or woven sachet comprising the compositions that is placed or attached to the wall inside of a closed environment of a food package. Such a sachet, for example, can be used to continuously reduce unwanted or target substances in the closed atmosphere of the packaged foodstuff thereby preserving and maintaining product freshness for enhanced consumer acceptance. The compositions of the invention can be used in the form of sachets. The sachets can contain the compositions of the invention in the form of particulate film or fiber. Alternatively the sachets can be made of fiber or film made from the compositions of the invention and can be formed to contain the materials of the invention. The sachets of our invention comprise hollow container fabricated from permeable, porous or non-porous materials. The container can take any form including but not limited to an envelope, a sheet, a non-woven or woven format. The containers can be closed using any closure technology including adhesive closure, heat seal technology or sewing. The porous materials are porous to the target adsorbents of the invention. The sachets of our invention are fabricated from permeable or porous materials that can be formed into enclosures. Such materials can be thermoplastics in the form of woven fabric, non-woven or film that can be heat sealed to form enclosures. However, the enclosures of our invention may be fabricated from non-porous materials if the walls have discrete openings so that adsorbents may pass there through as they arise. Examples of useful materials are synthetics such as nonwoven polyesters; synthetic nonwoven polypropylene and natural woven cotton interlock materials. Nonwoven fiber (spun-bond, melt-blown or electro-spun) comprises a fiber selected from the group consisting of: polyolefins (e.g., polyethylene, polypropylene), polylactic acid, polyesters (PET, CPET & rPET), nylons, acetates, any other polymers and copolymers capable of being formed into fibers; natural fibers comprising cotton, cellulose capable of being formed into a sheet or woven and combinations thereof. The sachet enclosures are fabricated from sheet goods or planar substances having a basis weight of from about 3 to about 120 grams per square meter as a measurement of the weight of the materials. The geometry of the sachets of our invention may be spherical, ellipsoidal, cylindrical or conical. The dimensions may be such that the length may vary from about 1 inch to 6 inches; the width may vary from about 1 inch to about 5 inches; and, in the case of a spherical sachet, the diameter may vary from about 1 inch to about 5 inches. In fabricating the sachets of our invention, two sheet-like prefabricated portions, matching in periphery having closable or heat-sealable edges can be used. Polymer fiber or particulate are placed on the surface of one of the prefabricated sections the surfaces of the prefabricated sections are joined conventionally. Representative packaged products would include postharvest produce, salted snacks, such as potato chips and peanuts, bakery products, confectionery, breakfast cereals, rice, to name but a few.

In certain embodiments, the present disclosure provides a container article comprising a film of the present invention. Such a film preferably has a thickness of 500 µm or less and more preferably 0.5 to 400 µm. In certain thin-film applications and/or handling, the thickness of the film is preferably 10 to 300 µm and more preferably 20 to 200 µm. The film can comprise a thermoplastic polymer composition comprising a blend of a polyolefin resin and a chemically-modified polyolefin resin or a blend of thermoplastic resins (e.g., PE, PP, PET and polylactic acid (PLA)) and can be made using conventional methods. Flexible films are typically melt extruded through a straight or circular die and can have thickness of, for example, from about 4 micrometers (μm) to about 200 μm. The films may be extruded at much greater thickness, and then stretched in one or two directions to a thin, uniform film. Post-extrusion stretching, uniaxial or biaxial, can also provide orientation of the molecular structure that can further enhance strength and barrier properties of the film. Processes for extrusion and laminating thermoplastic materials are described in U.S. Pat. Nos. 3,400,190; 3,440,686; 3,477,099; 3,479,425; 3,476,627; 3,524,795; 3,557,265; 3,583,032; and 3,365,750. Many coextruded structures are made up of polyolefins such as polyethylene and polypropylene. These polyolefins are useful for compositions of the invention. Low density polyethylene (LDPE) and linear low density polyethylene (LLDPE) resins have been used extensively in coextruded structures for their toughness and sealability. High density polyethylene (HDPE) resins are selected for their moisture barrier, stiffness and machineability characteristics. Polypropylene (PP) is chosen for its ability, through orientation, to provide clear machineable films with high impact and stiffness properties. Polyolefins can be combined with other resins to achieve multilayer functionality. Copolymers of ethylene-vinyl acetate (EVA), ethylene-acrylic acid (EAA), and ethylene-meth acrylic acid (EMA) are regularly used as skin layers for their low-temperature sealing characteristics.

Semi-Rigid Films are produced by straight die melt extrusion or calendaring. Multilayer structures can be, for example, a co-extrusion or an adhesive lamination. Typical thermoforming grade films can have thickness of, for example, from about 200 microns to about 1 millimeter. The coextruded sheet structures may be high-barrier packages. Polystyrene, polyester, polypropylene, and the polyethylenes are the predominant structural materials used in co-extrusions for semi-rigid packaging applications. Known co-extrusion structures for semi-rigid packaging is described in U.S. Pat. Nos. 3,479,425 and 3,557,265. Structural resin selection is dependent on use requirements, co-extrusion processability, and container-forming considerations. Such films can be heat softened and vacuum formed into tubs, pots, blisters, trays and punnets.

Rigid films can be made by, for example, extrusion, co-extrusion, profile extrusion, injection molding, compression molding, reaction injection molding, injection blow molding, or any other thermal processes known in the art. Rigid structures typically have thicknesses greater than 1 millimeter, and may have thickness of up to 2.0 cm or even greater thicknesses. Many of these containers are of a monolayer structure as the large wall thickness provides for an adequate barrier. Where a high barrier is required, multilayer structure techniques can be used. One such rigid structure is a storage unit, such as for storing food, clothing, soiled items, household wastes, and the like. Such structures can be, for example, a diaper pail, a vegetable bin for a refrigerator, a reusable food container, a general storage bin, or a garbage container.

Composite Materials typically multilayer plastic structures can be further extended with the inclusion of one or more plastic or non-plastic materials. Materials that can be combined with plastics to form composites can be, for example, thermoset resin, aluminum, paper, felt, paperboard, nonwovens and like materials. The combination of paper, paperboard, foil, and thermoplastic polymers, can provide, for example, a sealable high-barrier structure. Multilayer packaging structures are described in U.S. Pat. Nos. 3,274,905; 4,720,039; 5,829,669 and 6,244,500. Combining thermoplastics with paperboard can provide hermetic, rigid composite structures, such as round, canister and shaped composite paperboard cans, paperboard pails, fiber cartridges. Common uses of such structures are, for example, powdered beverages and infant formulas, cereal, coffee, snacks, nuts, cookies and crackers, confectionery, spices/seasonings, nutritional supplements, and pet foods. In such applications, the compositions of the invention provide new packaging performance attributes for high barrier packages, particularly when used for foods that are susceptible to undesirable food decomposition flavor and odor within the package.

Multifunctional packaging resins can be combined into one manufacturing step using, for example, co-extrusion technology. Multilayer structures are distinct coextruded layers of different polymers formed by a simultaneous extrusion of the polymers through a single die. Multilayer films produced by lamination or co-extrusion can offer an enhancement of many or all performance properties compared to monolayer films. Typically, a multilayer plastic film can incorporate compositions of the invention into one or more layers, typically a layer exposed to the enclosed atmosphere depending on the desired functionality. Coextruded multilayer structures can be divided into three categories: single-resin, unbalanced, and balanced. There can be, for example, multilayer films using only one polymer (AAA), unbalanced coextruded films with combinations of two or more polymers (ABC), and balanced multilayer structures with combinations of two or more polymers (A/B/C/B/A). Unbalanced structures typically combine a functional layer with a heat-seal resin. Balanced structures generally have the same heat-sealable resin on both the outside and inside surface of the film.

In certain embodiments, the present disclosure provides a container article comprising a fabric. Such a fabric can be a portion of the structure with the enclosed volume or enclosed ambient vapor phase. The fabric comprising a woven or nonwoven web, the web comprising a fiber comprising a thermoplastic polymer composition comprising a blend of a polyolefin resin and a chemically-modified polyolefin resin or a blend of thermoplastic resins (e.g., PE, PP, PET and polylactic acid (PLA)). The article comprises a nonwoven web comprising a spun-bond fabric, a melt-blown fabric, an electro-spun fabric, and combinations thereof. Examples of spun-bond fabric and melt-blown fabric are known in the art, and may be spun-bond-melt-blown-spun-bond (SMS), spun-bond-melt-blown-melt-blown-spun-bond (SMMS), and like permutations or combinations. Other articles, such as a litter box, shoe box, food storage box or bin, laundry basket, or clothing box or bag may advantageously incorporate liners having compositions of the invention incorporated therein. Further, the polyolefin used in disposable plastic garbage bags, garment bags, diaper bags, vacuum cleaner bags, and the like can also be made using polymer with an effective amount of polyolefin having covalently bonded cyclodextrin. In embodiments, any of the abovementioned articles or components can be prepared or processed with any of the abovementioned processes or any of the following melt based processes to form a desired article or component structure, and combinations thereof, including: spun-bond, melt-blown, nanofiber, porous film, or co-form. In embodiments, any of the abovementioned articles or components can also be prepared or processed with any of the following staple-based or natural fiber based processes or structures, and combinations thereof, including: hydro-entanglement, bonded-carded, needle punched, airlaid, wetlaid, and like processes and structures, or combinations thereof.

Fibers used in the disclosure can include any polymer fibers known in the art. The thread-like fibers used in fashioning articles of the disclosure include a composition comprising a polyolefin or blends of polyolefin, nylon, polystyrene, polyacrylonitrile, polycarbonate, PEO, PET and water-soluble polymers [cellulose acetate, chitosan, hydroxyethyl cellulose (HEC), pectin, gelatin, sodium chondroitin sulfate, polyacrylamide (PAAm), poly(vinyl alcohol) (PVA), polyacrylonitrile (PAN), polysaccharide, and dispersions of styrene-acrylate copolymers] with an adsorbent comprising a CD compound in combination with polyethyleneimine and silica particles, and can be used to construct or coat a nonwoven web comprised of one or more overlapping or interconnected fibers in a nonwoven manner. The fibers can be, for example, in the form of a long filament produced by spun melt, melt blown or electro-spun processes. Any nonwoven polyolefin fibers known in the art may be used in embodiments of the disclosure. The nonwoven webs may be used, for example, to construct articles, which have an improved odor control system to reduce or eliminate malodors caused by bodily fluids, such as blood, urine, menses, tears, and like fluids or discharge. In embodiments, the composition of this invention can be coated onto the surface or homogeneously distributed throughout the fiber surface using co-extrusion or electrospinning techniques permitting malodor compounds to adsorb onto the fiber surface where they are complexed or effectively trapped by the CD throughout the entire fiber length thereby substantially preventing their olfactory detection.

In addition to a substituted CD or a polymer with pendent CD moiety, the containers of the disclosure can include, in various embodiments, a mixture of natural and synthetic fibers; reactive fibers; scavenging fibers (e.g., zeolite, activated charcoal, and like scavengers); biodegradable polymer materials such as polylactic acid; a reduced basis weight; or combinations thereof. The containers of the disclosure may have a range of properties imparted to them, such as breathability; stretchability; shape or body-conforming capability; cloth-like aesthetics and feel; rigidity; high strength; transparency or opacity; a smooth or patterned surface; and the like.

In addition to the abovementioned fiber applications, including methods and materials, the webs and fabrics fashioned there from can comprise bicomponent fibers. Bicomponent fiber technology enables manufacturers to, for example: reduce cost; improve strength and softness; produce ultra-fine fibers; provide improved loft, crimp, or both; and like process and product improvements. One type of bicomponent fiber is a known material in which the fiber contains an amount of polymer having a relatively high melting point and a second amount of a polymer having a relatively low melting point. In the formation of a web or layer of a web, the fiber is heated to a temperature such that the low melting point polymer can melt, fuse and bind the layer or web into a mechanically stable, unitary mass. The relatively high melting point polymer component can provide mechanical strength and stability to the layer or web. Bicomponent fibers can thus allow the fabrication of thermally bonded webs, thus providing additional strength, cohesiveness, and robustness of nonwoven webs made from them. Where such properties are desired, use of bicomponent fiber is often sufficient to impart these properties and no further binders or procedures are required to provide the web with additional cohesiveness, strength, etc. Some embodiments of the invention may also comprise nanofiber. Nanofiber can be formed, for example, by electrospinning, where fibers are spun with diameters of from about 10 nm to several hundred nm. The resulting fiber properties can depend on, for example, field uniformity, polymer viscosity, electric field strength, the distance between nozzle and collector, and like considerations.

Web production methods useful for fiber and fabric preparation can include any other suitable method, such as extrusion. Co-extrusion, spunlace, porous film, co-form, bonded-carded, needle punch, airlaid, wetlaid, and like methods, or combinations thereof. Spunlace processing, also known as hydro-entangling, involves mechanically wrapping and knotting fibers in a web through the use of high velocity jets of water. Spunlaced nonwovens work well for wipes because they are soft, strong, easy to handle, and provide good absorption. In embodiments, methods useful for fiber and fabric preparation can additionally include any other suitable processing methods, for example, thermo-bonding, chemical or resin bonding, and like methods. In some embodiments, fibers, fabrics and absorbent materials of the invention can include other suitable functional or performance additives or treatments, for example, an antimicrobial, an anti-static agent, a flame retardant, a fluorochemical, a wetting agent, an ultraviolet stabilizer, a laminate, a binder or an adhesive, a hot melt adhesive, a filler, a silane coupling agent, and like additives or treatments, or combinations thereof. In embodiments, depending upon its disposition and purpose in the fiber or final article, an additive can be included, for example, in a masterbatch, added directly to an extruder, applied topically to a fiber or web surface, and like inclusion methods, or combinations thereof. In embodiments, a binder or an adhesive can include, for example, an acrylic, a hot melt, a latex, a polyvinyl chloride, a pressure sensitive adhesive, a styrenated acrylic, styrene butadiene, vinyl acetate, ethylene vinyl acetate, vinyl acrylic, a melt-fusible fiber, a partially meltable bicomponent fiber (e.g., PE/PP, PE/PET, specially formulated PET/PET), and like materials, or combinations thereof.

Cyclodextrin is a cyclic oligomer of α-D-glucose formed by the action of certain enzymes such as cyclodextrin glycotransferase (CGTase). Three cyclodextrins (alpha, beta, and gamma) are commercially available consisting of six, seven, and eight α-1,4-linked glucose monomers, respectively. The most stable three-dimensional molecular configuration for these oligosaccharides is a toroid with the smaller and larger opening of the toroid presenting primary and secondary hydroxyl groups. The specific coupling of the glucose monomers gives the CD a rigid, truncated conical molecular structure with a hollow interior of a specific volume. The CD can be used as a substituted CD or a polymer with pendent CD moiety. CD molecules have available for reaction a primary hydroxyl at the six position of the glucose moiety, and at the secondary hydroxyl in the two and three positions. Because of the geometry of the CD molecule, and the chemistry of the ring substituents, all hydroxyl groups are not equal in reactivity. However, with care and effective reaction conditions, substantially dry CD molecules can be reacted to obtain a grafted CD. A CD with selected substituents, i.e., substituted only on the primary hydroxyl or selectively substituted only at one or both the secondary hydroxyl groups can also be grafted if desired. Directed synthesis of a derivatized molecule with two different substituents or three different substituents is also possible. These substituents can be placed at random or directed to a specific hydroxyl. These substituents may be chosen such that they the site of the grafting reaction. For example, alcohol derivatives (e.g., hydroxyethyl and hydroxypropyl) and amino derivatives of CD can be reacted with a substituent on a polymer backbone to make a grafted CD.

The oligosaccharide ring forms a torus, as a truncated cone, with primary hydroxyl groups of each glucose residue lying on a narrow end of the torus. The secondary glucopyranose hydroxyl groups are located on the wide end. The parent CD molecule, and useful derivatives, can be represented by the following formula (the ring carbons showing conventional numbering) in which the vacant bonds represent the balance of the cyclic molecule: wherein $R_1$ and $R_2$ are primary or secondary hydroxyl as shown. The CD internal cavity size must be considered and the functional group modification must be suitable for changing the desired bulk polymer and surface polymer characteristics in addition to forming an inclusion complex with targeted volatiles or impurities. To achieve a specific result, more than one cavity size and functional group may be necessary. Thus, it may be advantageous to graft more than one species of CD to a polymer for a particular end use.

A preferred preparatory scheme for producing a substituted CD material involves reactions at the primary or secondary hydroxyls of the CD molecule. It is meant that a hydroxyl functionality of the CD reacts with a substituent forming reactant. The formation of an ester or ether bond on either the primary or secondary ring hydroxyls of the CD molecule involve well-known reactions. Further, CD having less than all of available hydroxyls substituted with derivative groups can be grafted with one or more of the balance of the available hydroxyls. The primary —OH groups of the cyclodextrin molecules are more readily reacted than the secondary groups. However, the molecule can be substituted on virtually any position to form useful compositions. Broadly, we have found that a wide range of pendant substituent moieties can be used on the molecule. These derivatized cyclodextrin molecules can include, for example, alkylated cyclodextrin, hydrocarbyl-amino cyclodextrin, and like derivatives. The substituent moiety must include a region that provides compatibility to the derivatized material. Amino and other azido cyclodextrin derivatives of pendant thermoplastic polymer of the disclosure can be used in the sheet, film, fiber, or container of the disclosure. A sulfonyl derivatized cyclodextrin can be used to generate the amino derivative from the sulfonyl group substituted cyclodextrin via nucleophilic displacement of the sulfonate group by an azide ($N_3^{-1}$) ion. The azido derivatives are subsequently converted into substituted amino compounds by reduction. Such derivatives can be manufactured in symmetrical substituted amine groups (those derivatives with two or more amino or azido groups symmetrically disposed on the cyclodextrin skeleton or as a symmetrically substituted amine or azide derivatized cyclodextrin. Due to the nucleophilic displacement reaction that produces the nitrogen containing groups, the primary hydroxyl group at the 6-carbon atom is the most likely site for introduction of a nitrogen-containing group. Examples of nitrogen containing groups that can be useful in the disclosure include acetylamino groups (—NHAc), alkylamino including methylamino, ethylamino, butylamino, isobutylamino, isopropylamino, hexylamino, and other alkylamino substituents. The amino or alkylamino substituents can further be reactive with other compounds that react with the nitrogen atom to further derivatize the amine group. Other possible nitrogen containing substituents include, for example, dialkylamino such as dimethylamino, diethylamino, piperidino, piperizino, and like substituents. The cyclodextrin molecule can be substituted with heterocyclic nuclei including, for example, pendant imidazole groups, histidine groups, imidazole groups, pyridino groups, and substituted pyridino groups. Cyclodextrin derivatives can be modified with sulfur containing functional groups to introduce compatibilizing substituents onto the cyclodextrin. Sulfur containing groups can be manufactured based on sulfhydryl chemistry and can be used to derivatize cyclodextrin. Such sulfur containing groups include, for example, hydroxyethylthio (—S—$CH_2CH_2OH$), imidazolylmethylthio, aminoalkylthio, and like groups.

The invention can also include a polymer with pendent CD moiety. Commercial polymer functionalization can be achieved, for example, using solution, melt and solid state routes known in the art. The process covalently bonds monomers onto vinyl polymers or onto polyolefin polymers including, for example, copolymers of olefins with other monomers, such as vinyl monomers, which predominately constitute the olefin portion. Polyolefins useful in this disclosure include, for example, poly(ethylene) or PE, poly(propylene) or PP, poly(ethylene-co-propylene) or PEP, ethylene/methyl acrylate copolymer, ethylene/ethyl acrylate copolymer, ethylene-α.-octene copolymer, ethylene-butene copolymers, and like polymers and copolymers. The polyolefins can be functionally modified with unsaturated compounds such as unsaturated anhydrides and carboxylic acids. Additionally, there can be modified terpolymers of, for example, ethylene-acrylate (ethyl or butyl)-maleic anhydride, ethylene-methyl acrylate-glycidyl methacrylate, and like polymers. In embodiments, any packaging grade of a vinyl polymer can be used. The modified polymers of the invention can be derived in some embodiments from a polymer having a melt index of about 0.7 to 1,800 g-10 $min^{-1}$. In other embodiments, the modified polymers of the invention can be derived from a polymer having a melt index of about 1 to about 1,200 g-10 $min^{-1}$.

Functionalized polyolefins can be used with the coatings of the invention or blended with the CD pendant polymers. Functionalized polyolefins, have extensive industrial applications such as extrusion or coextrusion tie resins in multilayer films and bottles for the food industry, compatibilizers for engineering polymers and plastic fuel tank tie resins for the automotive industry, flexibilization and compatibilization of halogen free polymers for cables, for filler materials used in roofing construction, and like applications. Functionalized polyolefins useful in the present disclosure include, for example, maleated polyethylene and polypropylene (OREVAC and LOTRYL from Atofina Chemicals Inc. of Philadelphia, Pa., PLEXAR and INTEGRATE resins from Equistar Chemicals L.P of Houston, Tex., FUSABOND resins from DuPont Co. of Wilmington, Del., OPTM resins from Manas of Ankara, Turkey, ADMER resins from Mitsui Chemicals of Rye Brook, N.Y., and EXXELOR from Exxon/Mobil Corp. of Irving, Tex.), maleic anhydride functionalized ethylene vinyl acetate copolymers (EVA-MA, such as Orevac EVA-MA from Atofina or Fusabond C series EVA-MA from DuPont); EPDM (such as ethylene-propylene-butadiene or ethylene-propylene-1,4-hexadiene polymers) ethylene/1-butene copolymers, ethylene/1-hexene copolymers, ethylene/1-octene copolymers, ethylene-n butyl acrylate-maleic anhydride copolymers, ethylene-ethylacrylate-maleic anhydride terpolymers, or copolymers of ethylene and glycidyl methacrylate. Other polymers, that are not olefinic, can also be employed in embodiments of the invention. For example, styrene-maleic anhydride (SMA) copolymers are a particularly useful group of reactive copolymers. SMA copolymers are available as, for example, Hiloy SMA copolymers from A. Schulman Inc. of Akron, Ohio, Prevex, SMA from General Electric Co. of Fairfield, Conn. and Dylark SMA from NOVA Chemicals of Calgary, Alberta Moon Township, Pa. Ethylene-propylene-1,4-hexadiene polymer can be represented as: wherein x, y and z can be selected to obtain, for example, about 70 to 90 wt % ethylene, about 10 to 30 wt % propylene and up to about 5 wt % 1,4-hexadiene $R_1$ and $R_2$ may be similar groups, H, or end groups.

The copolymerization of styrene with maleic anhydride to form SMA copolymer provides a material with a higher glass transition temperature than polystyrene and is chemically reactive as it provides maleic anhydride functionality. SMA copolymers are often used in blends or composites where interaction or reaction of the maleic anhydride provides for desirable interfacial effects. SMA is utilized in the automotive industry for the injection molding and thermoforming of interior parts. The superiority of SMA over polystyrene is due to its higher heat deflection temperature, which is required for automotive use. SMA copolymers have also been extensively used as binder polymers due to the reactive maleic anhydride moieties, which can easily be functionalized with a group or groups to provide tailorable surface energy and chemical compatibility. For example, Keil et al., U.S. Pat. Nos. 5,576,145, 5,698,370, and 5773518 disclose an SMA based binder polymer in which the maleic anhydride residues are mono-esterified to between about 50 and about 65 mole percent of an alkyl, aryl, cycloalkyl, alkaryl, or arylalkyl alcohol having a molecular weight greater than 100 as a means of providing interlayer adhesion between two incompatible polymers.

Another useful polymer that can be grafted with CD to form a CD grafted polymer of the invention is polypropylene. Commercially, maleic anhydride bonded to polypropylene is available, for example, from Honeywell Performance Products of Heverlee, Belgium or the Sigma Aldrich Company of St. Louis, Mo. However, maleic anhydride is also easily added to polypropylene, e.g. in an extrusion reaction by adding maleic anhydride to a molten extrusion stream of polypropylene. In such reaction schemes, CD can advantageously be added further down in the extrusion path, where it can react with the maleic anhydride groups on the modified polypropylene. The general reaction scheme of incorporating maleic anhydride into polypropylene using a radical source such as hydrogen peroxide is shown below.

The compositions with pendent CD moieties of the disclosure can be coated, extruded, laminated, woven, or molded into a variety of useful films, sheets, fibers, nonwoven webs, monolithic structures, or other shapes using conventional processing technology. In addition to making an article having the olefinic compositions with pendent CD moieties of the disclosure dispersed substantially throughout the article, the article can have discrete areas where the olefinic compositions with pendent CD moieties are deposited, or where they migrate during manufacture. For example, an article may have a coating or film comprising olefinic compositions with pendent CD moieties disposed on the surface of the monolithic article, or on part of the surface of the article. Alternatively, the article can have one or more discrete parts other than a surface wherein the olefinic compositions with pendent CD moieties reside.

Polymer with pendent CD compositions of this disclosure may be prepared using, for example, reactive extrusion by feeding a dry cyclodextrin, or derivative thereof, (<0.10% moisture), a functionalized polyolefin and optionally a second polyolefin, into an extruder at temperatures such that the cyclodextrin reacts with the functionalized polyolefin as the molten polymer and cyclodextrin are transported through the extruder to form a reaction product containing, for example, an ester group which covalently bonds the cyclodextrin to the polyolefin. The ratio of functionalized polyolefin to non-functionalized polyolefin can be adjusted for a specific application and conversion process. In embodiments, the present disclosure is directed to a stoichiometric reaction product of a cyclodextrin and a polymer grafted linking agent (i.e., anhydride, epoxide, etc.), resulting in a modified polymer especially suited as a masterbatch which can be subsequently let down with one or more non-functionalized thermoplastic polymers or thermoplastic elastomers at a weight ratio of one part of the masterbatch composition to between one and fifty parts of non-functionalized polymer. In other words the blend of polymer and master batch, or functionalized polymer, after blending can contain about 0.02 to 50 wt % of the CD functionalized polymer, in certain applications the polymer can contain about 0.1 to 10 wt % of the functionalized polymer or about 0.5 to 5 wt % of the functionalized polymer. The stoichiometric ratio for melt grafting can be calculated on a gram-mole (gram-formula-weight) basis where one (1) gram-mole of CD ($\alpha$, $\beta$ or $\gamma$) is equivalent to one (1) gram-mole of the grafted anhydride, glycidyl or carboxylic acid moiety.

PEI can be uniformly surface coated onto CD particles prior to grafting CD onto functionalized polyolefin by reactive extrusion. The PEI coating and sensitive drying of the CD is carried out concurrently in a vacuum tumble dryer providing constant rotation of the CD in a controlled atmosphere. A stainless steel tumble dryer, jacketed with circulating oil heating walls, and equipped with a liquid spray bar running along the center of horizontal rotation of the dryer is used to spray the aqueous PEI coating solution onto the CD particles which are in constant motion. The vacuum lowers the boiling point of the water, while constant CD particle contact with the vessel walls provides fast heat input for uniform drying. This coating process prevents lumping, segregation and allows uniform PEI coating of the CD particles.

After the CD is loaded into the dryer drum and sealed, the circulating oil is heated to 120° C. and the drum is rotated at 20 rpm and a vacuum pump system reduces the pressure in the drum to a vacuum of 28 in. Hg. The pressure is maintained as the CD in the dryer drum is heated. Next an aqueous PEI solution, containing about 1 wt. % to 25 wt. % PEI, is introduced through the liquid spray bar over a 2 minute period. Rotation is continued to allow the PEI to coat onto the surface of the CD. The addition of the resin emulsion is repeated at 5 to 30 minute intervals depending on PEI solution concentration and coating weight with operating conditions maintained at the same level until the entire PEI coating solution is added. After the entire PEI coating water is recovered in the cold water condenser trap, the oil is heated to 130° C. until the CD reached a moisture content <1% water. The CD is allowed to cool while purging with dry nitrogen until the CD is below 65° C. when it is then discharged and packaged in moisture resistant packaging.

The vacuum tumble drying process can also be used to PEI coat silica gel, precipitated silica and fumed silica. The process is identical to the CD coating process except the aqueous PEI solutions contain about 0.1 wt. % to 5 wt. % PEI. In embodiments, the coupling of the unmodified cyclodextrin to the maleic anhydride pendant groups on the polyolefin can be accomplished cleanly in high yield, and without a catalyst or an initiator. Thus, the grafted CD polymer products and articles prepared there from are free of such small molecule contaminants, such as a catalyst, an initiator, or free cyclodextrin in the product. Such contaminants, if present, can undesirably leech from the product polymer, polymer blends, or useful articles. The articles of the disclosure may suitably comprise, consist of, or consist essentially of, a film, a sheet, or a nonwoven web which includes a thermoplastic polymer composition having a coating, a blend of a polyolefin resin and a substituted CD or CD modified polyolefin resin, the modified polyolefin having randomly substituted and covalently bonded cyclodextrin groups. Thus, the invention illustratively disclosed herein suitably may be practiced in the absence of any element which is not specifically disclosed herein.

A food package article or food package component of the disclosure can be, for example, a package component such as a tray, a packing liner, a barrier layer, a scavenger layer, and like components, or combinations thereof. Long-established food packaging concepts are limited in their ability to extend the shelf-life of food products. Innovative food packaging concepts of the disclosure can, for example, interact with the environment inside the package and respond by changing their properties to maintain, adjust or improve the specific package headspace atmosphere or minimize food flavor loss to the package by "scalping" (i.e., uptake of volatile components by the polymeric package material from the food) thereby adding to product quality and extending shelf-life. The most notable group of technologies in use today for controlling package headspace oxygen is oxygen scavengers.

The present disclosure relates to the use of the packaged food contact polymer layer to selectively remove undesirable off-flavors from the packaged foods. A food package contact layer can be constructed to remove offensive odors/aromas from the interior of food packages produced by, for example, lipid oxidation, lipid hydrolysis, protein/amino acid breakdown, and like changes or reactions of the packaged food. These active packaging polymer improvements of the disclosure are significant compared to conventional polyolefins and can considerably improve food taste over the shelf-life term of the product.

As the plastics industry has matured, it has developed numerous specialty packaging applications. A large number of single and multi-layer structures are available to store liquid or solid, food or non-food products. There continues to be a need for high performance, value-added packaging that is capable of maintaining or improving a specific internal package environment to assure improved quality, safety, and shelf-life, while also achieving this objective from progressively thinner films. Current low oxygen-barrier packaging methods do not eliminate all the deteriorative chemical reactions produced by the stored foods or the packaging, so undesirable chemical by-products such as odor and taste taints continue to be produced in trace amounts, and these are effectively retained in the headspace of the package and the product thereby reducing product flavor quality and shelf-life. When the ratio (proportion) or the total concentration of these compounds gets too high, they can contribute to food off-flavor. Low and intermediate moisture level foods comprise a large part of the shelf-stable foods such as cereals, crackers, cookies, salted snacks, etc. They contain fat, protein, and starches, and are subject to many deteriorative chemical reactions. The most important chemical changes are associated with hydrolytic reactions, enzymatic action, oxidative reactions, particularly lipid oxidation that alters the flavor of many lipid containing foods, and non-enzymatic browning. The chemical compounds produced from these reactions vary widely in their chemical and physical properties. They also vary in their impact on flavor. Some produce offensive odors and flavors, often causing major problems in the storage of foods. In breakfast cereal, for example, accelerated shelf life studies using elevated temperature and low humidity produce a number of deteriorative chemical compounds. Compositions of the invention can minimize the headspace accumulation of volatile chemical family compounds by adsorbing such compounds A large proportion of fresh fruits, vegetables, and cut flowers harvested are lost due to spoilage resulting from increased levels of ethylene gas in the package headspace. One of the ways to retard the ripening of fruits, vegetables, and fresh flowers is to reduce the ethylene gas present in the headspace. The ethylene absorbing capacity of a LDPE film can be improved by having a thin contact inner layer of the inventive composition. Cyclodextrin grafted polymers containing PEI and silica can be used as the inside product contact layer in a multilayer structure to extend product shelf-life by reducing ethylene gas in the headspace surrounding the product and maintaining the appropriate humidity (generally greater than about 80% RH) so undesirable wilting and shriveling doesn't take place. If the produce is sealed in an impermeable film, headspace $O_2$ levels will fall to low levels where anaerobic respiration takes place forming undesirable odor and flavor compounds such as ethanol, acetaldehyde and organic acids. One advantage of invention composition is that a high surface area and concentration of CD that can be used in the LDPE skin layer or on the surface of nonwoven fiber to improve the partitioning of ethylene gas and other organoleptic precursors from the headspace without degrading the intrinsic olefin barrier properties to moisture, gasses or clarity.

In another embodiment of the invention, a multilayer film can be used as a food packaging film, wherein one layer has a substituted CD or polyolefin-CD grafted material incorporated as part or a layer on the package. In these embodiments, coextrusion is one method whereby CD grafted to a polymer can be incorporated into one of two or more layers in a packaging film. Another method to provide such an embodiment is coating, wherein a packaging film is provided with an extrusion coated polymer or an aqueous coating on a previously corona treated film surface to increase the surface energy of the film surface. Some portion or all of the coated polymer or the coating can contain the invention composition. Where substituted or polyolefin-CD grafted materials are integrated into packaging for fresh produce such as fruits, vegetables, and flowers, it will be appreciated by one of skill in the art that the CD can be present on only a minor portion of the packaging and still be effective in scavenging ethylene or other noxious vapor phase substances. Large amounts of CD are not required in most applications.

In yet another embodiment of the invention, CD grafted polymers of the invention can be provided as a web of film or as nonwoven fibers, wherein a piece of web is simply added to a package that is then filled with fresh fruits, vegetables, or flowers. In such an embodiment, the packaging material used can be any suitable material and is not limited in any way. Commonly used packaging materials such as polyethylene, PLA or polyester, and the like can be used without any limitation, as the composition of the invention is simply added to the finished packaging along with the fresh produce to be packaged. Since the composition is present in a separate material, it can be added to any package where undesirable vapor phase substances are desirably scavenged.

The compositions can be made with amounts of the components as shown in the following tables.

| | Substituted Cyclodextrin Compositions | | |
|---|---|---|---|
| Components | First Embodiment (Wt. %) | Second Embodiment (Wt. %) | Third Embodiment (Wt. %) |
| Substituted CD | 48.0 | 35.5 | 24.6 |
| Polyethylenimine | 0.65 | 1.0 | 1.3 |
| Silica | 51.3 | 63.5 | 74.1 |

Grafted Cyclodextrin Compositions

| Components | First Embodiment (Wt. %) | Second Embodiment (Wt. %) | Third Embodiment (Wt. %) |
|---|---|---|---|
| Polymer grafted - CD | 79.2 | 89.85 | 96.75 |
| Polyethylenimine | 0.8 | 0.15 | 0.25 |
| Silica | 20.0 | 10.0 | 3.0 |

The adsorbent compositions illustrated above are normally dispersed in water; water is from about 50 wt. % to 95 wt. %. The aqueous compositions are then applied to a substrate to reduce unwanted or target substances from an enclosed volume which the substrate is exposed. The amount of the composition used in or applied to may vary depending on the nature of the substrate (i.e., fiber or film) and the intended application. In most embodiments, the odor control composition constitutes from about 2.5 to about 50 wt. % of the substrate, in some embodiments from about 5 to about 30 wt. % of the substrate, and in some embodiments, from about 10 to about 20 wt. % of the substrate. The adsorbent composition may be applied to a substrate using any of a variety of well-known application techniques. For instance, the composition may be incorporated within the matrix of the substrate and/or applied to the surface thereof. Suitable techniques for applying an aqueous composition to a substrate include spraying, dipping, aqueous coating, printing, and so forth. Techniques for applying non-aqueous compositions include various melt extrusion techniques previously described.

The inventive compositions may be formed into an adsorbent bag, packet or sachet containing gas permeable/vapor permeable sheet material outside protecting the inside inventive composition from contacting with the container contents. The outer sheet is composed of a gas-permeable sheet and the edges of the sheets are sealed, preferably by heat sealing or thermally welding on the outer edge forming a integrated multilayered structure. Accordingly, the inventive composition is enclosed within the layered structure, and the outer sheets (top and bottom) comprising gas/vapor-permeable sheets having a multiplicity of minute pores allowing the enclosed gaseous volume or atmosphere to enter the sachet. The outer sheet materials (e.g., hydrophobic treated porous paper, nonwoven fiber or microporous plastic film) constitute an essential portion of the bag, packet or sachet structure intended as a barrier which prevents mutual contact or mixing of the inventive composition of the sachet with the sealed package contents, e.g., foodstuffs. Outer sachet materials are resistant to water or provide an impermeable barrier to water but are porous and readily permit gas and vapor, e.g., ethylene, low boiling organic compounds and water vapor, to enter through the pores. The porous barrier material can be produced from polyethylene, polypropylene, ethylene-vinyl acetate copolymer and ethylene-acrylic ester copolymer, polyester or a composite or laminate. Known packet and sachet structures are described in U.S. Pat. Nos. 4,856,649, 5,371,322, 5,773,105 and 6,776,947. Gas/vapor-permeability can be obtained by using, as an external protective barrier material, a sheet composing a nonwoven fiber (DuPont's Tyvek®), porous paper (Tokuso's GDT II) or microporous plastic film (Clopay's Micropore™). The porous barrier materials used in the present invention preferably have a thickness not greater than 150 um from a practical point of view. More preferably, the thickness ranges between 10 and 50 um. The barriers preferably weigh between about 10 and 200 g/m², have a porosity in Gurley seconds from about 5 to about 150 seconds/100 cc, and MVTR of 500 to 9,500 g/m²/day (based on ASTM E96-2000).

The inner inventive composition can be made of one of the single-layer, multiple layers, laminate or composite structures having a thickness from 10 um to 25 mm. The inner layer can be three dimensional nonwovens or closed cell polyethylene sheets or other forms. The bags, packets or sachets can be sized to the enclosed volume and the compositions tailored for the specific unwanted or target substances.

Ethylene Sorption

Table 1 illustrates a series of example materials capability to reduce ethylene gas under static test conditions at room temperature. Table 1 includes data for four main sample groupings: 1) commercial films; 2) cyclodextrin powder with polyethylenimine surface coatings; 3) spunbond (SB) nonwoven fiber with a surface coating of a cyclodextrin and polyethyleneimine solution; and lastly, 4) SB nonwoven fiber with a surface coating from a solution of cyclodextrin, polyethyleneimine (PEI) and either silica gel or fumed silica.

Each material was challenged with 14 parts per million ethylene gas in a 250 mL glass serum bottle sealed with PTFE/silicone septa screw cap. After placing the test sample into the bottle and sealing, it is injected with 200 μL of ethylene gas (17,922 ppm) providing a 14.3 ppm ethylene concentration. Samples are stored at 20° C.; at selected time intervals 4, 24, 48 and 72 hours, the headspace is analyzed by GC/FID. Sorption is determined by difference from initially measured ethylene concentration and reference standards analyzed in parallel.

In the examples section, detailed sample preparation information for each of the material is provided. Table 1 summarizes all of the applicable information including additional test time interval data. A brief summary of the four bar chart groupings follows:

1. Commercial Films. Two commercial film products were tested for ethylene sorption. The manufacturers claim that the bags will reduce ethylene gas generated by produce stored within the sealed bags. Using these two products as a basis for performance in the room temperature static ethylene sorption test, all of the other example materials can be compared. Commercial film test samples measured 21.5 cm×21.5 cm and weighed approximately 1.35 grams; films had identical densities. (Comparative Examples 9A and 9B)

2. Cyclodextrin Powder with PEI Surface Coating. Alpha cyclodextrin (sample 1A) shows significantly lower ethylene sorption than methyl beta cyclodextrin (1B, 3A to 4H) under identical conditions. Cyclodextrin powders with PEI coatings for ethylene sorption testing weighed 1.0 gram.

3. Spunbond Nonwoven Fiber with a Surface Coating of Cyclodextrin with PEI. Surface coated spunbond (SB) nonwoven fiber samples (5A-5E) measured 21.5 cm×21.5 cm weighing approximately 0.95 grams with 0.10 to 0.18 grams of cyclodextrin coating. CD coated SB samples had similar ethylene sorption as the commercial films.

4. Spunbond Nonwoven Fiber with a Surface Coating from a Solution of Cyclodextrin, PEI and either Silica Gel or Fumed Silica. Both silica gel (7A-7G) and fumed silica (8A-8C) significantly improve ethylene sorption performance in combination with methylated beta cyclodextrin and PEI. Coated SB fiber samples measured 21.5 cm×21.5 cm weighing approximately 0.95 grams with coating weight varying from 0.3 to 0.9 grams.

Table 1 illustrates ethylene sorption performance of commercial bags, parent alpha CD and methylated beta cyclodextrin derivatives with PEI surface coatings, thin coatings of CD applied over SB fiber, and SB fiber coatings containing a mixture of methylated beta CD, PEI and silica gel or fumed silica. Unmodified CD has little ethylene sorption compared to the methyl derivatives whereas methyl beta CD coatings applied to a nonwoven fiber surface has significantly less ethylene sorption than the same coating containing either silica gel or fumed silica. It has been reported in the literature that Japanese researchers have complexed ethylene with alpha cyclodextrin, however the ethylene complexes where in an aqueous medium at 1 to 1.5 atmospheres pressure. This ethylene pressure is more than five to eight orders of magnitude greater than the instant invention ethylene headspace pressure.

Adsorption Test Method

The static adsorption test method is most easily explained in terms of a test substrate surrounded by a fixed volume (e.g., glass bottle). Test substrate and volume are initially free of the test solute (ethylene gas) inside the close-volume bottle. At time zero, a specific weight of the test substrate is exposed to a known concentration of the ethylene gas challenge standard. Headspace concentrations are measured at different time intervals following introduction of the ethylene challenge standard. The ethylene headspace concentration surrounding the test structure is quantitated using gas chromatography.

A gas chromatograph (HP 5890) operated with flame ionization detection (FID), a six-port heated sampling valve with 1 mL sampling loop and data collection software (HP ChemStation A06.03-509) is used to measure the ethylene headspace concentration. Static headspace concentration is determined in test samples using a five point ethylene calibration curve measured in μL of ethylene per 250 mL bottle volume and presented as μL/L or parts per million (vol./vol.) ethylene.

Test substrates are placed into a 250 mL serum bottle with Teflon® faced silicone septa. 200 μL of the working "stock" challenge standard (17,922 PPM)) is injected onto the glass bottle through the septa. The serum bottle is maintained at room temperature (20° C.) during the test interval. At each sampling interval, the serum bottle headspace is sampled by removing 1 mL of gas from the sample bottle using a Valco Instrument six port manual gas sampling valve (Valco #DC6WE) interface directly to the GC column.

| HP 5890 GC | |
|---|---|
| | Setpoint |
| Zone Temperatures: | |
| Six port valve | 45° C. |
| Detector (FID) | 150° C. |
| Over Zone: | |
| Equib Time | 3.00 min. |
| Oven Program: | |
| Isothermal Temp.: | 45° C. |
| Initial Time: | 1.20 min. |
| Runtime (min): | 1.20 min. |
| Injection: | Direct on-column |
| Split Flow: | 30 mL/min |
| Column: | Rt-QS-Bond 30 m × 0.53 mm × 20 μm |

The ethylene working standard is prepared by diluting 25 mL of 99.5% pure ethylene gas (Scotty Gas #25881-U) in a Tedlar® gas sampling bag containing 1 liter of air. The ethylene working standard concentration is 17,922 μL/L (PPM).

Calibration standards are prepared at five concentration levels by injecting via a 250 μL gas tight syringe (Hamilton Gastight® #1725) 50, 100, 150, 200 and 250 μL of the working standard into 250 mL the serum bottles fitted with Teflon® faced silicone septa. ChemStation software is used to calculate an ethylene response factor using a linear regression equation. The ethylene standard curve correlation coefficient is 0.999.

The test substrate is placed into a 250 mL serum bottle and injected with 200 μL of ethylene working standard providing a 14.3 ppm ethylene headspace concentration. Following the addition of the working standard, the bottle's headspace is initially analyzed at 5 minutes to obtain a precise ethylene headspace concentration. Parenthetically, little or no adsorption takes place in the first 5 minutes following the addition of the ethylene challenge. The sample bottles are stored at 20° C. At selected time intervals, the headspace is analyzed by GC/FID. Adsorption is determined by difference from the initially measured ethylene concentration at 5 minutes and the later headspace sampling time. QC reference standards are analyzed in parallel monitoring test precision and accuracy. Samples and QC reference samples are analyzed in triplicate and values averaged.

Example 1

Two grams of a 4% aqueous solution of polyethylenimine (Aldrich Chemical #423475) is coated onto 5 grams of alpha cyclodextrin (Wacker Chemie W6) and again with 5 grams of methyl beta cyclodextrin (Wacker Chemie methyl beta CD, DS=1.2) The aqueous coated W6 and methyl beta CD cyclodextrins are dried at 105° C. After drying, the coated CD samples are ground to a fine powder by mortar and pestle. Tertiaryamine Dowex resins (Dowex SD-2, Dowex M-77 and MSA1 were tested as received. 1.0 gram of CD powder or Dowex resin is placed into a 250 mL serum bottle and sealed with PTFE/silicone septa screw cap. 250 mL sample bottles are challenged with 200 μL of ethylene gas (17,922 ppm) providing a 14.3 ppm ethylene headspace concentration. The samples were stored at 20° C.; at selected time intervals, the headspace is analyzed by GC/FID. Sorption is determined by difference from initially measured ethylene concentration and reference standards analyzed in parallel.

| | Ex 1A | Ex 1B | Dowex™ SD-2 | Dowex™ M-77 | Dowex™ MSA1 |
|---|---|---|---|---|---|
| Materials | | | | | |
| Alpha Cyclodextrin | 99% | | | | |
| Methyl beta Cyclodextrin | | 99% | | | |
| PEI (#423475) | 1.0% | 1.0% | | | |
| Ethylene Sorption (μL/L-ppm) | | | | | |
| 4 hrs | 0.03 | 0.28 | 0.01 | 0.03 | 0.04 |
| 24 hrs | <0.01 | 0.41 | 0.02 | 0.15 | 0.04 |

Example 2

Four grams of three aqueous solution of polyethylenimine (Aldrich Chemical #423-475, 423-475 and 181978) is coated onto 2 grams of fumed silica (Cabot EH-5). The aqueous coated fumed silica is dried at 105° C. After drying, the coated silica samples are ground to a fine powder by mortar and pestle. 1.0 gram of powder is placed into a 250 mL serum bottle and sealed with PTFE/silicone septa screw cap. 250 mL sample bottles are challenged with 200 μL of ethylene gas (17,922 ppm) providing a 14.3 ppm ethylene headspace concentration. The samples were stored at 20° C.; at selected time intervals, the headspace is analyzed by GC/FID. Sorption is determined by difference from initially measured ethylene concentration and reference standards analyzed in parallel.

|  | Example 2A | Example 2B | Example 2C |
|---|---|---|---|
| Materials |  |  |  |
| EH-5 Fumed Silica | 99.5% | 98% | 95% |
| PEI (#423475) | 0.5% |  |  |
| PEI (#181978) |  | 2.0% |  |
| PEI (#423475) |  |  | 5.0% |
| Ethylene Sorption (μL/L-ppm) |  |  |  |
| 4 hrs | 0.04 | 0.05 | 0.03 |
| 24 hrs | 0.05 | 0.02 | 0.08 |

Example 3

Two and one half grams of a 2, 6 and 12 wt. % aqueous solution of polyethylenimine (Aldrich Chemical #423-475, 423-475 and 181978) is coated onto 5 grams of methyl beta cyclodextrin (Wacker Chemie methyl beta CD, DS=1.2) The aqueous coated methyl beta CD cyclodextrins are dried at 105° C. After drying, the coated CD samples are ground to a fine powder by mortar and pestle. 1.0 gram of powder is placed into a 250 mL serum bottle and sealed with PTFE/silicone septa screw cap. 250 mL sample bottles are challenged with 200 μL of ethylene gas (17,922 ppm) providing a 14.3 ppm ethylene headspace concentration. The samples were stored at 20° C.; at selected time intervals, the headspace is analyzed by GC/FID. Sorption is determined by difference from initially measured ethylene concentration and reference standards analyzed in parallel.

|  | Example 3A | Example 3B | Example 3C |
|---|---|---|---|
| Materials |  |  |  |
| methyl beta CD, DS = 1.2 | 99% | 95% | 94% |
| PEI(#423475) | 1.0% |  |  |
| PEI (#423475) |  | 3.0% |  |
| PEI (#181978) |  |  | 6.0% |
| Ethylene Sorption (μL/L-ppm) |  |  |  |
| 4 hrs | 0.36 | 0.37 | 0.09 |
| 24 hrs | 0.51 | 0.63 | 0.21 |
| 72 hrs | 0.75 | 1.02 | 0.55 |
| 264 hrs | 1.21 | 1.67 | 1.26 |

Example 3D, a PEI coated silica gel (Aldrich #246751), 40-200 mesh was compared to Davisil 643 silica gel (Aldrich #236810) test "as received". 1 gram of silica gel (Example 3E) is placed into a 250 mL serum bottle and sealed with PTFE/silicone septa screw cap. 250 mL sample bottles are challenged with 200 μL of ethylene gas (17,922 ppm) providing a 14.3 ppm ethylene headspace concentration. The samples were stored at 20° C.; at selected time intervals, the headspace is analyzed by GC/FID. Sorption is determined by difference from initially measured ethylene concentration and reference standards analyzed in parallel.

| Ethylene Sorption (μL/L-ppm) | PEI Coated Silica Gel | Davisil 643 |
|---|---|---|
| 4 hrs | 0.13 | 0.12 |
| 24 hrs | 0.16 | 0.12 |
| 72 hrs | 0.37 | 0.24 |
| 264 hrs | 0.95 | 0.79 |

Example 4

Two and one half grams of a 4% aqueous solution of polyethylenimine (Aldrich Chemical #408719, 468533 and 424560) is coated onto 5 grams of methyl beta cyclodextrins (Wacker Chemie methyl beta CD, DS=0.6 and 1.2) and 5 grams of methyl gamma cyclodextrin (Wacker W8M, DS=1.8). The aqueous coated methyl beta CD cyclodextrins are dried at 105° C. After drying, the coated CD samples are ground to a fine powder by mortar and pestle. 1 gram of powder is placed into a 250 mL serum bottle and sealed with PTFE/silicone septa screw cap. 250 mL sample bottles are challenged with 200 μL of ethylene gas (17,922 ppm) providing a 14.3 ppm ethylene headspace concentration. The samples were stored at 20° C.; at selected time intervals, the headspace is analyzed by GC/FID. Sorption is determined by difference from initially measured ethylene concentration and reference standards analyzed in parallel.

|  | Ex 4A | Ex 4B | Ex 4C | Ex 4D | Ex 4E | Ex 4F | Ex 4G | Ex 4H |
|---|---|---|---|---|---|---|---|---|
| Materials |  |  |  |  |  |  |  |  |
| methyl beta CD, DS = 0.6 | 98% | 98% | 98% |  |  |  |  |  |
| methyl beta CD, DS = 1.2 |  |  |  | 98% | 98% | 98% |  |  |
| methyl gamma CD, DS = 1.8 |  |  |  |  |  |  | 98% | 98% |
| PEI(#408719) | 2.0% |  |  | 2.0% |  |  | 2% |  |
| PEI (#468533) |  | 2.0% |  |  | 2.0% |  |  |  |
| PEI (#424560) |  |  | 2.0% |  |  | 2.0% |  | 2% |
| Ethylene Sorption (μL/L -ppm) |  |  |  |  |  |  |  |  |
| 4 hrs | 0.23 | 0.23 | 0.20 | 0.17 | 0.16 | 0.23 | 0.14 | 0.20 |
| 72 hrs | 0.48 | 0.46 | 0.54 | 0.34 | 0.25 | 0.43 | 0.13 | 0.13 |

Example 5

An aqueous solution of 98% methyl beta cyclodextrin and 2% polyethylenimine (Aldrich Chemical #408700, 408719, 468533, 424560 and 423-475) is coated onto pre-weighed 21.5 cm×21.5 cm spunbond fiber sheets (21 gsm web with 15 μm average fiber diameter). Fiber sheets are dip coated with the aqueous solution and then the coated fiber samples are air dried for 24 hours followed by 4 hours over sodium sulfate in a desiccator. Dry, coated fiber samples are weighed and the coating weight calculated. The coated fiber sheet is placed into a 250 mL serum bottle and sealed with PTFE/silicone septa screw cap. 250 mL sample bottles are challenged with 200 μL of ethylene gas (17,922 ppm) providing a 14.3 ppm ethylene headspace concentration. The samples were stored at 20° C.; at selected time intervals, the headspace is analyzed by GC/FID. Sorption is determined by difference from initially measured ethylene concentration and reference standards analyzed in parallel.

| | Cntrl SB Fiber | Ex 5A | Ex 5B | Ex 5C | Ex 5D | Ex 5E |
|---|---|---|---|---|---|---|
| Materials | | | | | | |
| methyl beta CD, DS = 1.2 | | 98% | 98% | 98% | 98% | 98% |
| PEI(#408700) | | 2.0% | | | | |
| PEI (#408719) | | | 2.0% | | | |
| PEI (#468533) | | | | 2.0% | | |
| PEI (#424560) | | | | | 2.0% | |
| PEI (#423475) | | | | | | 2.0% |
| Coating wt. on fiber | NA | 17% | 10% | 17% | 11% | 13% |
| Ethylene Sorption (µL/L -ppm) | | | | | | |
| 4 hrs | 0.04 | 0.16 | 0.13 | 0.18 | 0.06 | 0.15 |
| 72 hrs | 0.05 | 0.18 | 0.14 | 0.16 | 0.05 | 0.15 |

Example 6

An aqueous solution the same as Example 6 with the addition of 0.01% sodium lauryl sulfate is dip coated onto pre-weighed spunbond fiber sheets. Dry, coated fiber samples are weighed and the coating weight calculated. The coated fiber sheets are analyzed in an identical manner as Example 5.

| | Cntrl SB Fiber | Ex 6A | Ex 6B | Ex 6C | Ex 6D | Ex 6E |
|---|---|---|---|---|---|---|
| Materials | | | | | | |
| methyl beta CD, DS = 1.2 | | 98% | 98% | 98% | 98% | 98% |
| PEI(#408700) | | 2.0% | | | | |
| PEI (#408719) | | | 2.0% | | | |
| PEI (#468533) | | | | 2.0% | | |
| PEI (#424560) | | | | | 2.0% | |
| PEI (#423475) | | | | | | 2.0% |
| Sodium lauryl sulfate | | 0.01% | 0.01% | 0.01% | 0.01% | 0.01% |
| Coating wt. on fiber | NA | 18% | 17% | 15% | 16% | 18% |
| Ethylene Sorption (µL/L -ppm) | | | | | | |
| 4 hrs | 0.04 | 0.19 | 0.11 | 0.10 | 0.10 | <0.01 |
| 72 hrs | 0.02 | 0.22 | 0.11 | 0.08 | 0.12 | 0.01 |

Example 7

An aqueous solution of methyl beta cyclodextrin (Wacker methyl beta CD, DS=0.6), polyethylenimine (Aldrich Chemical #423-475 and 181978) and Davisil 643 silica gel (Aldrich #236810) is coated onto pre-weighed 21.5 cm×21.5 cm spunbond fiber sheets (21 gsm web with 15 m fiber diameter). Aqueous solutions all contained 0.05 wt.-% Tergitol 15-S-9 as a wetting agent. Fiber sheets are dip coated with the aqueous solution and then the coated fiber samples are air dried for 24 hours followed by 4 hours over sodium sulfate in a desiccator. Dry, coated fiber samples are weighed and the coating weight calculated. The coated fiber sheet is placed into a 250 mL serum bottle and sealed with PTFE/silicone septa screw cap. 250 mL sample bottles are challenged with 200 µL of ethylene gas (17,922 ppm) providing a 14.3 ppm ethylene headspace concentration. The samples were stored at 20° C.; at selected time intervals, the headspace is analyzed by GC/FID. Sorption is determined by difference from initially measured ethylene concentration and reference standards analyzed in parallel. Test samples analyzed in duplicate; average sorption value reported.

| | Cntrl SB Fiber | Ex 7A | Ex 7B | Ex 7C | Ex 7D | Ex 7E | Ex 7F | Ex 7G |
|---|---|---|---|---|---|---|---|---|
| Materials | | | | | | | | |
| methyl beta CD, DS = 0.6 | | 2.0% | 1.5% | 2.5% | 2.5% | 2.5% | 1.5% | 2.5% |
| PEI(#423475) | | 0.16% | 0.21% | 0.10% | 0.21% | 0.10% | 0.21% | 1.5% |
| PEI(#181978) | | | | | | | | 1.0% |
| Silica gel | | 3.5% | 2.6% | 2.6% | 4.4% | 2.6% | 4.4% | 4.0% |
| Water | | 94% | 96% | 95% | 93% | 95% | 94% | 91% |
| Coating wt. on fiber | NA | 37% | 37% | 47% | 36% | 46% | 45% | 96% |
| Ethylene Sorption (µL/L -ppm) | | | | | | | | |
| 4 hrs | 0.10 | 0.18 | 0.21 | 0.26 | 0.26 | 0.61 | 0.36 | 0.11 |
| 24 hrs | 0.07 | 0.26 | 0.63 | 0.74 | 0.45 | 1.82 | 0.78 | 0.27 |
| 48 hrs | 0.03 | 0.22 | 0.80 | 0.97 | 0.52 | 1.80 | 1.09 | 0.32 |
| 72 hrs | 0.03 | 0.38 | 1.49 | 1.65 | 0.82 | 2.16 | 1.65 | 0.61 |
| 96 hrs | 0.03 | 0.33 | 1.64 | 1.85 | 0.85 | 2.11 | 1.89 | 0.63 |

Example 8

An aqueous solution of methyl beta cyclodextrin (Wacker methyl beta CD, DS=0.6), polyethylenimine (Aldrich Chemical #423475) and Davisil 643 silica gel (Aldrich #236810) and fumed silica (Cabot EH-5) is coated onto pre-weighed 21.5 cm×21.5 cm spunbond fiber sheets (21 gsm web with 15 μm fiber diameter). Aqueous solutions all contained 0.05 wt.-% Tergitol 15-S-9 as a wetting agent. Fiber sheets are dip coated with the aqueous solution and then the coated fiber samples are air dried for 24 hours followed by 4 hours over sodium sulfate in a desiccator. Dry, coated fiber samples are weighed and the coating weight calculated. The coated fiber sheet is placed into a 250 mL serum bottle and sealed with PTFE/silicone septa screw cap. 250 mL sample bottles are challenged with 200 μL of ethylene gas (17,922 ppm) providing a 14.3 ppm ethylene headspace concentration. The samples were stored at 20° C.; at selected time intervals, the headspace is analyzed by GC/FID. Sorption is determined by difference from initially measured ethylene concentration and reference standards analyzed in parallel. Test samples analyzed in duplicate; average sorption value reported.

|  | Cntrl SB Fiber | Ex 8A | Ex 8B | Ex 8C |
|---|---|---|---|---|
| Materials |  |  |  |  |
| methyl beta CD, DS = 0.6 |  | 2.0% | 1.5% | 2.5% |
| PEI(#423475) |  | 0.16% | 0.21% | 0.10% |
| Silica gel |  | 3.5% | 2.6% | 2.6% |
| Fumed silica |  |  |  |  |
| Water |  | 94% | 96% | 95% |
| Coating wt. on fiber | NA | 37% | 37% | 47% |
| Ethylene Sorption (μL/L-ppm) |  |  |  |  |
| 4 hrs | 0.23 | 0.32 | 0.33 | 0.53 |
| 24 hrs | 0.24 | 0.37 | 0.34 | 0.58 |
| 48 hrs | 0.28 | 0.45 | 0.38 | 0.60 |

Comparative Example 9

Two commercial film products (Long Life™ Vegetable and Fruit Bags—manufactured under Australian patent No. 647410 and U.S. Pat. No. 5,221,571 and distributed by Seven Seas Trading S.L., and Debbie Meyer™ Green Bags®—sold by Debbie Meyer and Housewares America, Inc) were tested for ethylene sorption. The manufacturers claim that the bags will reduce ethylene levels generated by produce stored within the bags. The bags were sectioned into 21.5 cm×21.5 cm in pieces and placed into 250 mL serum bottle and sealed with PTFE/silicone septa screw cap. 250 mL sample bottles are challenged with 200 μL of ethylene gas (17,922 ppm) providing a 14.3 ppm ethylene headspace concentration. The samples were stored at 20° C.; at selected time intervals, the headspace is analyzed by GC/FID. Sorption is determined by difference from initially measured ethylene concentration and reference standards analyzed in parallel.

|  | μL/L (ppm) Ethylene Sorbed ||||||
|---|---|---|---|---|---|
| Product Identification | 4 hrs | 24 hrs | 48 hrs | 96 hrs | 168 hrs |
| Long Life ™ bags | 0.15 | 0.17 | 0.23 |  |  |
| Debbie Meyer ™ Green Bags ® | 0.14 | 0.16 | 0.12 | 0.16 | 0.14 |

The utility of Applicant's invention is demonstrated in the examples and tables of data shown above. In comparative example 9, the inability of the test commercial films to obtain any meaningful ethylene absorption is shown. These commercial films have insignificant ethylene absorption and in the context of preserving fruit for overrippening, these films will have little or no useful character. Examples 1-8 show substantial activity for the materials of the invention.

TABLE 1

| Example Comparative | Sample # | Cyclodextrin Type/DS | CD Wt. grams | Non-woven Fiber | Coating Wt. gm on Fiber | Wt/-% PEI (Based on Wt. of CD) |||| Oligomers | Ethoxylates | BDPAP |
|---|---|---|---|---|---|---|---|---|---|---|---|
|  |  |  |  |  |  | 800 | 2,000 | 750,000 |  |  |  |
| 9 | A | None |  |  |  |  |  |  |  |  |  |
|  | B | None |  |  |  |  |  |  |  |  |  |
| 1 | A | W6 | 1.0 | No |  | 1.0% |  |  |  |  |  |
|  | B | W7M, 1.2 | 1.0 | No |  | 1.0% |  |  |  |  |  |
|  | C | No |  | No |  |  |  |  |  |  |  |
|  | D | No |  | No |  |  |  |  |  |  |  |
|  | E | No |  | No |  |  |  |  |  |  |  |
| 2 | A | No |  | No |  | 0.5% |  |  |  |  |  |
|  | B | No |  | No |  |  |  |  |  | 5.0% |  |
|  | C | No |  | No |  |  |  | 2.0% |  |  |  |
| 3 | A | W7M, 1.2 | 1.0 | No |  | 1.0% |  |  |  |  |  |
|  | B | W7M, 1.2 | 1.0 | No |  |  |  |  |  | 3.0% |  |
|  | C | W7M, 1.2 | 1.0 | No |  |  |  | 6.0% |  |  |  |
|  | D | No | NA | No | PEI coated Silica gel from Aldrich Chem. |  |  |  |  |  |  |
|  | E | No | NA | No |  |  |  |  |  |  |  |
| 4 | A | W7M, 0.6 | 1.0 | No | 2% |  |  |  |  |  |  |
|  | B | W7M, 0.6 | 1.0 | No |  |  | 2% |  |  |  |  |
|  | C | W7M, 0.6 | 1.0 | No |  |  |  |  |  |  | 2% |
|  | D | W7M, 1.2 | 1.0 | No | 2% |  |  |  |  |  |  |
|  | E | W7M, 1.2 | 1.0 | No |  |  | 2% |  |  |  |  |
|  | F | W7M, 1.2 | 1.0 | No |  |  |  |  |  |  | 2% |
|  | G | W8M, 1.8 | 1.0 | No | 2% |  |  |  |  |  |  |
|  | H | W8M, 1.8 | 1.0 | No |  |  |  |  |  |  | 2% |
| 5 | SB CNTRL | No | NA | SB | NA |  |  |  |  |  |  |

TABLE 1-continued

|   |   |   |   |   |   |   |   |   |   |
|---|---|---|---|---|---|---|---|---|---|
|   | A | W7M, 1.2 | 0.166 | SB | 17% |   | 2% |   |   |
|   | B | W7M, 1.2 | 0.103 | SB | 10% | 2% |   | 2% |   |
|   | C | W7M, 1.2 | 0.154 | SB | 17% |   |   | 2% |   |
|   | D | W7M, 1.2 | 0.099 | SB | 11% |   |   |   | 2% |
|   | E | W7M, 1.2 | 0.113 | SB | 13% |   |   |   | 2% |
| 6 | SB CNTRL | No | NA | SB | NA |   |   |   |   |
|   | A | W7M, 1.2 | 0.165 | SB | 18% | 2% |   |   |   |
|   | B | W7M, 1.2 | 0.170 | SB | 17% | 2% |   |   |   |
|   | C | W7M, 1.2 | 0.147 | SB | 15% |   |   | 2% |   |
|   | D | W7M, 1.2 | 0.174 | SB | 16% |   |   |   | 2% |
|   | E | W7M, 1.2 | 0.177 | SB | 18% |   |   |   | 2% |
| 7 | SB CNTRL | No | NA | SB | NA |   |   |   |   |
|   | A | W7M, 0.6 | 0.113 | SB | 37% |   |   |   | 2.9% |
|   | B | W7M, 0.6 | 0.128 | SB | 37% |   |   |   | 5.1% |
|   | C | W7M, 0.6 | 0.217 | SB | 47% |   |   |   | 1.4% |
|   | D | W7M, 0.6 | 0.127 | SB | 36% |   |   |   | 3.0% |
|   | E | W7M, 0.6 | 0.221 | SB | 46% |   |   |   | 1.4% |
|   | F | W7M, 0.6 | 0.107 | SB | 45% |   |   |   | 5.1% |
|   | G | W7M, 0.6 | 0.303 | SB | 96% |   | 20.5% |   | 21.5% |
| 8 | SB CNTRL | No | NA | SB |   |   |   |   |   |
|   | A | W7M, 0.6 | 0.081 | SB |   |   |   |   | 1.4% |
|   | B | W7M, 0.6 | 0.154 | SB |   |   |   |   | 1.4% |
|   | C | W7M, 0.6 | 0.231 | SB |   |   |   |   | 1.4% |

| Example Comparative | Sample # | Wt.-% Silica (based on CD Wt.) | | Surfactant | | PPM Ethylene Sorbed (time in hours) at 20° C. | | | | | | |
|---|---|---|---|---|---|---|---|---|---|---|---|---|
|   |   | Davisil 643 | Fumed | Tergitol | SLS | 4 | 24 | 48 | 72 | 96 | 168 | 264 |
| 9 | A |   |   |   |   | 0.15 | 0.17 | 0.23 |   |   |   |   |
|   | B |   |   |   |   | 0.14 | 0.16 | 0.12 |   | 0.16 | 0.14 |   |
| 1 | A |   |   |   |   | 0.03 | <0.01 |   |   |   |   |   |
|   | B |   |   |   |   | 0.28 | 0.41 |   |   |   |   |   |
|   | C |   |   |   |   | 0.01 | 0.02 |   |   |   |   |   |
|   | D |   |   |   |   | 0.03 | 0.15 |   |   |   |   |   |
|   | E |   |   |   |   | 0.04 | 0.04 |   |   |   |   |   |
| 2 | A |   | EH-5 |   |   | 0.04 | 0.05 |   |   |   |   |   |
|   | B |   | EH-5 |   |   | 0.05 | 0.02 |   |   |   |   |   |
|   | C |   | EH-5 |   |   | 0.03 | 0.08 |   |   |   |   |   |
| 3 | A |   |   |   |   | 0.36 | 0.51 |   | 0.75 |   |   | 1.21 |
|   | B |   |   |   |   | 0.37 | 0.63 |   | 1.02 |   |   | 1.67 |
|   | C |   |   |   |   | 0.09 | 0.21 |   | 0.55 |   |   | 1.26 |
|   | D |   |   |   |   | 0.13 | 0.16 |   | 0.37 |   |   | 0.95 |
|   | E | x |   |   |   | 0.12 | 0.12 |   | 0.24 |   |   | 0.79 |
| 4 | A |   |   |   |   | 0.23 |   |   |   | 0.48 |   |   |
|   | B |   |   |   |   | 0.23 |   |   |   | 0.46 |   |   |
|   | C |   |   |   |   | 0.20 |   |   |   | 0.54 |   |   |
|   | D |   |   |   |   | 0.17 |   |   |   | 0.34 |   |   |
|   | E |   |   |   |   | 0.16 |   |   |   | 0.25 |   |   |
|   | F |   |   |   |   | 0.23 |   |   |   | 0.43 |   |   |
|   | G |   |   |   |   | 0.14 |   |   |   | 0.13 |   |   |
|   | H |   |   |   |   | 0.20 |   |   |   | 0.13 |   |   |
| 5 | SB CNTRL |   |   |   |   | 0.04 | 0.05 |   |   |   |   |   |
|   | A |   |   |   |   | 0.16 | 0.18 |   |   |   |   |   |
|   | B |   |   |   |   | 0.13 | 0.14 |   |   |   |   |   |
|   | C |   |   |   |   | 0.18 | 0.16 |   |   |   |   |   |
|   | D |   |   |   |   | 0.06 | 0.05 |   |   |   |   |   |
|   | E |   |   |   |   | 0.15 | 0.15 |   |   |   |   |   |
| 6 | SB CNTRL |   |   |   |   | 0.04 | 0.02 |   |   |   |   |   |
|   | A |   |   |   | x | 0.19 | 0.22 |   |   |   |   |   |
|   | B |   |   |   | x | 0.11 | 0.11 |   |   |   |   |   |
|   | C |   |   |   | x | 0.10 | 0.08 |   |   |   |   |   |
|   | D |   |   |   | x | 0.10 | 0.12 |   |   |   |   |   |
|   | E |   |   |   | x | <0.01 | 0.01 |   |   |   |   |   |
| 7 | SB CNTRL |   |   |   |   | 0.10 | 0.07 | 0.03 |   | 0.03 | 0.03 |   |
|   | A | 179% |   |   | x | 0.18 | 0.26 | 0.22 |   | 0.38 | 0.33 |   |
|   | B | 181% |   |   | x | 0.21 | 0.63 | 0.80 |   | 1.49 | 1.64 |   |
|   | C | 107% |   |   | x | 0.26 | 0.74 | 0.97 |   | 1.65 | 1.85 |   |
|   | D | 179% |   |   | x | 0.26 | 0.45 | 0.52 |   | 0.82 | 0.85 |   |
|   | E | 107% |   |   | x | 0.61 | 1.82 | 1.80 |   | 2.16 | 2.11 |   |
|   | F | 302% |   |   | x | 0.36 | 0.78 | 1.09 |   | 1.65 | 1.89 |   |
|   | G | 163% |   |   | x | 0.11 | 0.27 | 0.32 |   | 0.61 | 0.63 |   |
| 8 | SB CNTRL |   |   |   |   | 0.23 | 0.24 | 0.28 |   |   |   |   |
|   | A | 107% |   |   | x | 0.32 | 0.37 | 0.45 |   |   |   |   |
|   | B |   | 107%* |   | x | 0.33 | 0.34 | 0.38 |   |   |   |   |
|   | C |   | 107%** |   | x | 0.53 | 0.58 | 0.60 |   |   |   |   |

Key:
W6: Alpha cyclodextrin
W7M: Methylated beta cyclodextrin
DS: Degree of substitution TABLE 1-continued SB CNTRL: Spunbond control
Davisil 643: Surface area 300 m²/g; particle size 35-70 μm; pore size 150 Å; pore volume 1.15 cm³/g
W8M: Methylated gamma cyclodextrin
SLS: Sodiun lauryl sulfate
*4012K Fumed Silica: Surface area 380 m²/g; no pores; 3-dimensional branched chain aggregates with a chain length of 200 to 300 nm; diameter 50 to 300 Ångström
**EH-5 Fumed Silica: Surface area 380 m²/g; no pores; 3-dimensional branched chain aggregates with a chain length of 200 to 300 nm; diameter 50 to 300 Ångström In the table of data, the nomenclature, W6, W7 and W8 refer to α-cyclodextrin, β-cyclodextrin and λ-cyclodextrin respectively. The W7M refers to a methylated β-cyclodextrin with a DS of 1.3.

Example 1, polyethylenimine improves ethylene absorption for methylated beta-cyclodextrin but does not obtain similar enhanced performance with the alpha cyclodextrin. Macroporous styrene-divinylbenzene tertiaryamine and quaternary amine Dowex resins (Dowex SD-2, Dowex M-77 and MSA1) show insignificant ethylene absorption at 14 parts per million ethylene, but do achieve some level of adsorption at 30 parts per million ethylene or greater.

Example 2 demonstrates the ethylene absorption functionality using a combination of polyethylenimine and high surface area fumed silica.

Example 3 demonstrates that different polyethylenimine materials have ethylene adsorption functionality with a methylated beta-cyclodextrin. Polyethylenimine coated onto silica has better ethylene adsorption than silica gel "as received" without PEI coating. PEI coated methylated beta-CD shows greater ethylene sorption than PEI coated silica gel.

Example 4 shows three different methylated cyclodextrin with degree of substitution of 0.6, 1.2 and 1.8 (substitutents per glucose subunit) at the same PEI coating weight of different PEI's. A comparison of ethylene adsorption for PEI coated methylated beta-CD shows a degree of substitution of 0.6 has greater ethylene absorption methylated beta-CD having a degree of substitution equal to 1.2. PEI coated methylated gamma-CD with a degree of substitution of 1.8 results in poorer ethylene absorption than both lower degree of substitution methylated beta-CD.

Examples 5 and 6 compare spunbond fiber coatings of PEI and methylated beta-CD (Example 5) to spunbond coating of PEI, methylated beta-CD and sodium lauryl sulfate (Example 6). Sodium lauryl sulfate was added to the coating solution to improve wet-out of the fiber coating solution on the spunbond fiber. Overall, sodium lauryl sulfate does not improve ethylene adsorption and may lessen ethylene adsorption.

Example 7 demonstrates the effect of including silica gel particles into methylated beta-cyclodextrin (DS=0.6), and PEI coating solutions to increase surface area. The addition of silica gel particles to the fiber coating solution substantially improves ethylene absorption due to the increased surface area of the inventive composition. Further, the surface area is covered with a functional combination of methylated beta CD and PEI. This finding is surprising since it demonstrates a substantial headspace reduction of a very low boiling (−103.7° C.) organic gas at low pressure ($10^{-4}$ atmospheres) using a modified cyclodextrin and the addition of PEI improve absorbency.

Example 8 demonstrates the effect of including fumed silica or silica gel particles into the W7M/PEI coatings to increase surface area. Ionic surfactants are also used to improve fibrous surface wetting. Silica gel and fumed silica shows comparable and acceptable ethylene absorption. The nonionic surfactant does not appear to have any substantial effect on ethylene absorption.

Cyclodextrin Adsorption Measurements on Silica Particles

An aqueous solution of methyl beta CD (Wacker W7M, DS=1.0) was prepared with Davisil 710 silica gel (Aldrich #236756). 5.0 grams of methyl beta CD (DS=1.0), 5.5 grams of Davisil 710 and 189.5 grams of deionized water was added to a commercial Waring Blender (Hamilton Beach/Protor-Silex, Inc., Model 919). The Waring Blender was operated at low speed at 30 second intervals. At the end of each 30 second interval, a 10 mL aliquot was collected from the blender bowl using a 10 mL syringe and the aliquot then filtered through a 47 mm nylon filter (0.45 μm pore size, Osmonics 1213825). The clear supernatant, free of silica gel, is collected and weighed to 0.01 mg in a tarred aluminum weighing dish. The weighing dish is placed into a 105° C. oven and dried to constant weight. The methyl beta CD residue is calculated at each 30 second time interval.

| Time (min.) | Supernatant % Solids | Milligrams methyl beta CD sorbed per gm Silica (See also FIG. 1) |
| --- | --- | --- |
| 0 | 2.64 | 0 |
| 0.5 | 2.37 | 91.7 |
| 1.0 | 2.29 | 121 |
| 1.5 | 2.21 | 148 |
| 2.0 | 2.25 | 135 |
| 2.5 | 2.28 | 123 |
| 3.0 | 2.26 | 130 |
| 3.5 | 2.27 | 128 |
| 4.0 | 2.29 | 122 |
| 4.5 | 2.29 | 119 |
| 6.0 | 2.28 | 125 |

An aqueous solution of methyl beta CD (Wacker W7M, DS=1.0) was prepared with Cab-O-Sil® EH-5 fumed silica (Cabot Corp.). 5.7 grams of methyl beta CD (DS=1.0), 5.5 grams of Davisil 710 and 188.8 grams of deionized water was added to a commercial Waring Blender (Hamilton Beach/Protor-Silex, Inc., Model 919). The Waring Blender was operated at low speed at 30 second intervals. At the end of each 30 second interval, a 10 mL aliquot was collected from the blender bowl using a 10 mL syringe and the aliquot then filtered through a 47 mm nylon filter (0.45 μm pore size, Osmonics 1213825). The clear supernatant, free of fumed silica, is collected and weighed to 0.01 mg in a tarred aluminum weighing dish. The weighing dish is placed into a 105° C. oven and dried to constant weight. The methyl beta CD residue is calculated at each 30 second time interval.

Figure 2:
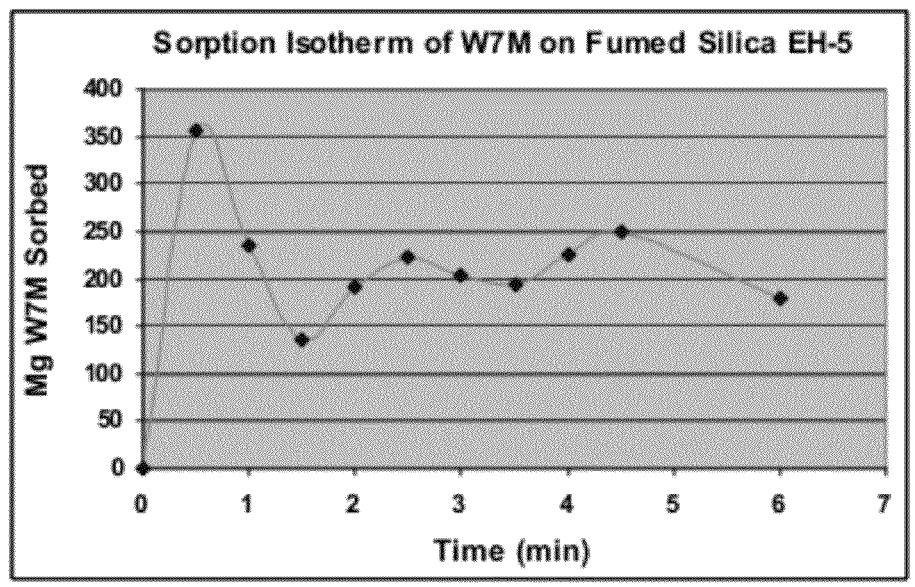

| Time (min.) | Supernatant % Solids | Milligrams methyl beta CD Sorbed per gm Silica (See also FIG. 2) |
| --- | --- | --- |
| 0 | 3.02 | 0 |
| 0.5 | 1.98 | 357 |
| 1.0 | 2.34 | 234 |
| 1.5 | 2.62 | 1.37 |
| 2.0 | 2.46 | 192 |

-continued

| Time (min.) | Supernatant % Solids | Milligrams methyl beta CD Sorbed per gm Silica (See also FIG. 2) |
|---|---|---|
| 2.5 | 2.37 | 224 |
| 3.0 | 2.43 | 204 |
| 3.5 | 2.46 | 193 |
| 4.0 | 2.36 | 226 |
| 4.5 | 2.29 | 251 |
| 6.0 | 2.50 | 178 |

The foregoing discloses embodiments of the invention. In the Specification and claims, "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. "Optional" or "optionally" means that the subsequently described event or circumstance may but need not occur, and that the description includes instances where the event or circumstance occurs and instances in which it does not. For example, "A optionally B" means that B may but need not be present, and the description includes situations where A includes B and situations where A does not include B. "Includes" or "including" or like terms means "includes but not limited to." The present invention may suitably comprise, consist of, or consist essentially of, any of the disclosed or recited elements. Thus, the invention illustratively disclosed herein can be suitably practiced in the absence of any element which is not specifically disclosed herein. The use of the singular typically includes and at least does not exclude the plural.

The specification, figures, examples and data provide a detailed explanation of the invention as it has been developed to date. The invention, however, can take the form of non-wovens, fibers, films, sheets, bottles, caps, and other embodiments without departing from the spirit or the intended scope of the invention. The invention therefore resides in the appended claims.

We claim:

1. An adsorbent capable of absorbing unwanted or target substances at a vapor phase concentration of less than 15 part per million, the adsorbent comprising structure having a surface area of at least 200 $m^2 \cdot gm^{-1}$; the adsorbent comprising:
    a. a substituted cyclodextrin or polyolefin-cyclodextrin grafted material at a concentration of about 0.1 to 50 wt % of the cyclodextrin on the adsorbent;
    b. an effective amount of polyethylenimine to reduce the surface charge inherent in cyclodextrin compound to maximize adsorption.

2. The adsorbent of claim 1 wherein the cyclodextrin is a substituted cyclodextrin with a degree of substitution of about 0.30 to 0.95.

3. The adsorbent of claim 2 wherein the substituted cyclodextrin is a cyclodextrin $C_{1-5}$ alkyl ether.

4. The adsorbent of claim 2 wherein the substituted cyclodextrin is a cyclodextrin methyl ether.

5. The adsorbent of claim 4 wherein the methyl ether substituent is on the 2 hydroxyl position of the cyclodextrin.

6. The adsorbent of claim 1, wherein the polyethylenimine has a molecular weight of 800 to 1,000,000.

7. The adsorbent of claim 1, wherein the polyethylenimine is a substituted polyethylenimine.

8. The adsorbent of claim 1, wherein the polyethylenimine composition comprises an ethoxylated polyethylenimine.

9. The adsorbent of claim 1, wherein the adsorbent additionally comprises silica having a surface area that ranges from about 200 to 1000 $m^2 \cdot gm^{-1}$.

10. The adsorbent of claim 1, wherein there is about 0.5-5 wt % of polyethylenimine based on the content of the cyclodextrin.

11. The adsorbent of claim 1 wherein the adsorbent is used on a substrate.

12. The adsorbent of claim 11, wherein the substrate comprises a fiber.

13. The adsorbent of claim 11, wherein the substrate comprises a fabric.

14. The adsorbent of claim 13, wherein the fabric comprises a non woven fabric.

15. The adsorbent of claim 11, wherein the substrate comprises a web having a thickness of about 0.01 to 10 mm.

16. The adsorbent of claim 11, wherein the substrate comprises a paperboard web.

17. The adsorbent of claim 11, wherein the substrate comprises a polyolefin film.

18. An enclosed volume comprising a vapor phase comprising unwanted or target substances and an adsorbent capable of adsorbing unwanted or target substances at a concentration of less than 15 part per million, the adsorbent comprising a substrate having a surface area of at least 200 $m^2 \cdot gm^{-1}$; and a coating comprising:
    a. a cyclodextrin compound at a loading of about 0.5 to 50 wt % of the cyclodextrin on the adsorbent;
    b. an effective amount of polyethylenimine to reduce the surface charge inherent in cyclodextrin compound to maximize adsorption.

19. The enclosed volume of claim 18 wherein the cyclodextrin is a substituted cyclodextrin with a degree of substitution of about 0.30 to 0.95.

20. The enclosed volume of claim 19 wherein the substituted cyclodextrin is a cyclodextrin $C_{1-5}$ alkyl ether.

21. The enclosed volume of claim 19 wherein the substituted cyclodextrin is a cyclodextrin methyl ether.

22. The enclosed volume of claim 21 wherein the methyl ether substituent is on the 2 hydroxyl position of the cyclodextrin.

23. The enclosed volume of claim 18, wherein the polyethylenimine has a molecular weight of 800 to 1,000,000.

24. The enclosed volume of claim 23, wherein the polyethylenimine is a substituted polyethylenimine.

25. The enclosed volume of claim 18, wherein the polyethylenimine composition comprises an ethoxylated polyethylenimine.

26. The enclosed volume of claim 19, wherein the enclosed volume additionally comprises silica having a surface area that ranges from about 200 to 1000 $m^2 \cdot gm^{-1}$.

27. The enclosed volume of claim 18, wherein there is about 0.5 to 5 wt % of polyethylenimine based on the content of the cyclodextrin.

28. The enclosed volume of claim 18 wherein the enclosed volume contains a substrate.

29. The enclosed volume of claim 18, wherein the substrate comprises a fabric.

30. The enclosed volume of claim 18, wherein the fabric comprises a non woven fabric.

31. The enclosed volume of claim 18, wherein the substrate comprises a web having a thickness of about 0.01 to 10 mm.

32. The enclosed volume of claim 19, wherein the substrate comprises a paperboard web.

33. The enclosed volume of claim 18, wherein the substrate comprises a polyolefin film.

34. A method of adsorbing ethylene from the interior of a container for postharvest produce or flowers, and extending the useful life thereof, the method comprising placing postharvest produce or flowers in a container with an ethylene adsorbing composition, the composition comprising;
   a. a substituted cyclodextrin or polyolefin-cyclodextrin grafted material at a concentration of about 0.1 to 50 wt % of the cyclodextrin on the composition;
   b. an effective amount of polyethylenimine to reduce the surface charge inherent in cyclodextrin compound to maximize adsorption.

35. The method of adsorbing of claim 34 wherein the cyclodextrin is a substituted cyclodextrin with a degree of substitution of about 0.30 to 0.95.

36. The method of adsorbing of claim 35 wherein the substituted cyclodextrin is a cyclodextrin $C_{1-5}$ alkyl ether.

37. The method of adsorbing of claim 35 wherein the substituted cyclodextrin is a cyclodextrin methyl ether.

38. The method of adsorbing of claim 37 wherein the methyl ether substituent is on the 2 hydroxyl position of the cyclodextrin.

39. The method of adsorbing of claim 34, wherein the polyethylenimine has a molecular weight of 800 to 1,000,000.

40. The method of adsorbing of claim 39, wherein the polyethylenimine is a substituted polyethylenimine.

41. The method of adsorbing of claim 39, wherein the polyethylenimine composition comprises an ethoxylated polyethylenimine.

42. The method of adsorbing of claim 34, wherein the enclosed volume additionally comprises silica having a surface area that ranges from about 200 to 1000 $m^2 \cdot gm^{-1}$.

43. The method of adsorbing of claim 34, wherein there is about 0.5 to 5 wt % of polyethylenimine based on the content of the cyclodextrin.

44. The method of adsorbing of claim 36 wherein the enclosed volume contains a substrate.

45. The method of adsorbing of claim 44, wherein the substrate comprises a fabric.

46. The method of adsorbing of claim 45, wherein the fabric comprises a non woven fabric.

47. The method of adsorbing of claim 45, wherein the substrate comprises a web having a thickness of about 0.01 to 10 mm.

48. The method of adsorbing of claim 45, wherein the substrate comprises a paperboard web.

49. The method of adsorbing of claim 45, wherein the substrate comprises a polyolefin film.

50. A sachet comprising an adsorbent capable of adsorbing unwanted or target substances at a concentration of less than 15 part per million, the adsorbent comprising a substrate having a surface area of at least 200 $m^2 \cdot gm^{-1}$; the absorbent comprising:
   a. a cyclodextrin compound at a loading of about 0.5 to 50 wt % of the cyclodextrin on the adsorbent;
   b. an effective amount of polyethylenimine to reduce the surface charge inherent in cyclodextrin compound to maximize adsorption.

51. The sachet of claim 50 wherein the cyclodextrin is a substituted cyclodextrin with a degree of substitution of about 0.30 to 0.95.

52. The sachet of claim 51 wherein the substituted cyclodextrin is a cyclodextrin $C_{1-5}$ alkyl ether.

53. The sachet of claim 52 wherein the substituted cyclodextrin is a cyclodextrin methyl ether.

54. The sachet of claim 53 wherein the methyl ether substituent is on the 2 hydroxyl position of the cyclodextrin.

55. The sachet of claim 51, wherein the polyethylenimine has a molecular weight of 800 to 1,000,000.

56. The sachet of claim 51, wherein the polyethylenimine is a substituted polyethylenimine.

57. The sachet of claim 51, wherein the polyethylenimine composition comprises an ethoxylated polyethylenimine.

58. The sachet of claim 51, wherein the sachet additionally comprises silica having a surface area that ranges from about 200 to 1000 $m^2 \cdot gm^{-1}$.

59. The sachet of claim 51, wherein there is about 0.5 to 5 wt % of polyethylenimine based on the content of the cyclodextrin.

60. The sachet of claim 51, wherein the adsorbent comprises a sachet substrate.

61. The sachet of claim 51 wherein the sachet comprises a substrate and contains the adsorbent.

62. The sachet of claim 61, wherein the substrate comprises a fabric.

63. The sachet of claim 62, wherein the fabric comprises a non woven fabric.

64. The sachet of claim 62, wherein the substrate comprises a web having a thickness of about 0.01 to 10 mm.

65. The sachet of claim 62, wherein the substrate comprises a paperboard web.

66. The sachet of claim 62, wherein the substrate comprises a polyolefin film.

* * * * *